(12) United States Patent
McClurg et al.

(10) Patent No.: US 7,203,344 B2
(45) Date of Patent: Apr. 10, 2007

(54) BIOMETRIC IMAGING SYSTEM AND METHOD

(75) Inventors: George W McClurg, Jensen Beach, FL (US); John F Carver, Palm City, FL (US); Walter G Scott, Palm Beach, FL (US); Gregory Zyzdryn, Palm Beach, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 199 days.

(21) Appl. No.: 10/345,420

(22) Filed: Jan. 16, 2003

(65) Prior Publication Data

US 2003/0142856 A1    Jul. 31, 2003

Related U.S. Application Data

(60) Provisional application No. 60/348,678, filed on Jan. 17, 2002.

(51) Int. Cl.
*G06K 9/00* (2006.01)
(52) U.S. Cl. .................. 382/115; 382/124; 382/125
(58) Field of Classification Search ............... 382/124, 382/125, 112, 116, 115; 29/346; 198/396; 358/1.14; 340/5.83
See application file for complete search history.

(56) References Cited

U.S. PATENT DOCUMENTS

| | | | |
|---|---|---|---|
| 2,500,017 A | 3/1950 | Altman | 359/671 |
| 3,200,701 A | 8/1965 | White | 356/392 |
| 3,475,588 A | 10/1969 | McMaster | 219/208 |
| 3,482,498 A | 12/1969 | Becker | 396/15 |
| 3,495,259 A | 2/1970 | Rocholl et al. | 219/522 |
| 3,527,535 A | 9/1970 | Monroe | 356/71 |
| 3,540,025 A | 11/1970 | Levin et al. | 340/583 |
| 3,617,120 A | 11/1971 | Roka | 353/28 |
| 3,699,519 A | 10/1972 | Campbell | 382/125 |
| 3,743,421 A | 7/1973 | Maloney | 356/71 |
| 3,906,520 A | 9/1975 | Phillips | 396/15 |
| 3,944,978 A | 3/1976 | Jensen et al. | 382/127 |

(Continued)

FOREIGN PATENT DOCUMENTS

EP    0 101 772 A1    3/1984

(Continued)

OTHER PUBLICATIONS

English language abstract of Japanese Patent Publication No. 63-137206, published Jun. 9, 1988, 2 pages.

English translation of Russian Patent No. SU 1769854 A1, published Oct. 23, 1992, 3 pages.

Ratha, N.K. et al., "Fingerprint Image Quality Estimation," *IBM Research Report*, Dec. 1999, pp. 1-5.

(Continued)

*Primary Examiner*—Anh Hong Do
(74) *Attorney, Agent, or Firm*—Sterne, Kessler, Goldstein & Fox P.L.L.C.

(57) ABSTRACT

A method and system of obtaining a ten-print plain impression fingerprint includes scanning a print image, processing the scanned image, separating the processed image into individual fingerprint images, and determining how many print images have been scanned. The method also includes comparing the print image to a previously scanned print image, quality classifying the separated images, indicating a quality classification of the print image based on the classifying step, and determining whether the print image is of a good quality. The system can include a ten-print scanner having a finger guide and a platen used to position four finger slaps onto the platen.

45 Claims, 18 Drawing Sheets

U.S. PATENT DOCUMENTS

| | | | |
|---|---|---|---|
| 3,947,128 A | 3/1976 | Weinberger et al. | 356/71 |
| 3,968,476 A | 7/1976 | McMahon | 382/127 |
| 3,975,711 A | 8/1976 | McMahon | 382/126 |
| 4,032,975 A | 6/1977 | Malueg et al. | 358/482 |
| 4,063,226 A | 12/1977 | Kozma et al. | 365/125 |
| 4,120,585 A | 10/1978 | DePalma et al. | 356/71 |
| 4,152,056 A | 5/1979 | Fowler | 396/15 |
| 4,209,481 A | 6/1980 | Kashiro et al. | 264/437 |
| 4,210,889 A | 7/1980 | Holce | 335/207 |
| 4,210,899 A | 7/1980 | Swonger et al. | 382/125 |
| 4,253,086 A | 2/1981 | Szwarcbier | 382/126 |
| 4,322,163 A | 3/1982 | Schiller | 356/71 |
| 4,336,998 A | 6/1982 | Ruell | 356/71 |
| 4,358,677 A | 11/1982 | Ruell et al. | 250/216 |
| 4,414,684 A | 11/1983 | Blonder | 382/127 |
| 4,537,484 A | 8/1985 | Fowler et al. | 396/15 |
| 4,544,267 A | 10/1985 | Schiller | 356/71 |
| 4,553,837 A | 11/1985 | Marcus | 356/71 |
| 4,601,195 A | 7/1986 | Garritano | 73/54.34 |
| 4,635,338 A * | 1/1987 | Walsh | 29/436 |
| 4,669,487 A | 6/1987 | Frieling | 600/587 |
| 4,681,435 A | 7/1987 | Kubota et al. | 356/71 |
| 4,684,802 A | 8/1987 | Hakenewerth et al. | 250/235 |
| 4,701,772 A | 10/1987 | Anderson et al. | 347/136 |
| 4,783,823 A | 11/1988 | Tasaki et al. | 382/116 |
| 4,784,484 A | 11/1988 | Jensen | 356/71 |
| 4,792,226 A | 12/1988 | Fishbine et al. | 356/71 |
| 4,811,414 A | 3/1989 | Fishbine et al. | 382/272 |
| 4,876,726 A | 10/1989 | Capello et al. | 382/124 |
| 4,905,293 A | 2/1990 | Asai et al. | 382/126 |
| 4,924,085 A | 5/1990 | Kato et al. | 250/227.28 |
| 4,933,976 A | 6/1990 | Fishbine et al. | 382/127 |
| 4,942,482 A | 7/1990 | Kakinuma et al. | 358/474 |
| 4,946,276 A | 8/1990 | Chilcott | 356/71 |
| 4,995,086 A | 2/1991 | Lilley et al. | 382/124 |
| 5,054,090 A | 10/1991 | Knight et al. | 382/127 |
| 5,067,162 A | 11/1991 | Driscoll, Jr. et al. | 382/126 |
| 5,067,749 A | 11/1991 | Land | 283/117 |
| 5,096,290 A | 3/1992 | Ohta | 356/71 |
| 5,131,038 A | 7/1992 | Puhl et al. | 340/5.61 |
| 5,146,102 A | 9/1992 | Higuchi et al. | 250/556 |
| 5,157,497 A | 10/1992 | Topper et al. | 348/615 |
| 5,177,353 A | 1/1993 | Schiller | 250/227.11 |
| 5,185,673 A | 2/1993 | Sobol | 358/296 |
| 5,187,747 A | 2/1993 | Capello et al. | 382/124 |
| 5,210,588 A | 5/1993 | Lee | 356/71 |
| 5,222,152 A | 6/1993 | Fishbine et al. | 382/127 |
| 5,222,153 A | 6/1993 | Beiswenger | 382/127 |
| 5,230,025 A | 7/1993 | Fishbine et al. | 382/127 |
| 5,233,404 A | 8/1993 | Lougheed et al. | 356/71 |
| 5,249,370 A | 10/1993 | Stanger et al. | 34/443 |
| 5,253,085 A | 10/1993 | Maruo et al. | 358/481 |
| 5,261,266 A | 11/1993 | Lorenz et al. | 73/1.15 |
| 5,285,293 A | 2/1994 | Webb et al. | 358/471 |
| 5,291,318 A | 3/1994 | Genovese | 359/17 |
| D348,445 S | 7/1994 | Fishbine et al. | D14/384 |
| 5,351,127 A | 9/1994 | King et al. | 356/445 |
| D351,144 S | 10/1994 | Fishbine et al. | D14/384 |
| 5,363,318 A | 11/1994 | McCauley | 702/85 |
| 5,384,621 A | 1/1995 | Hatch et al. | 399/42 |
| 5,412,463 A | 5/1995 | Sibbald et al. | 356/71 |
| 5,416,573 A | 5/1995 | Sartor, Jr. | 356/71 |
| 5,448,649 A | 9/1995 | Chen et al. | 382/126 |
| 5,467,403 A | 11/1995 | Fishbine et al. | 382/116 |
| 5,469,506 A | 11/1995 | Berson et al. | 713/186 |
| 5,471,240 A | 11/1995 | Prager et al. | 348/164 |
| 5,473,144 A | 12/1995 | Mathurin, Jr. | 235/380 |
| 5,483,601 A | 1/1996 | Faulkner | 382/115 |
| 5,509,083 A | 4/1996 | Abtahi et al. | 382/124 |
| 5,517,528 A | 5/1996 | Johnson | 375/259 |
| 5,528,355 A | 6/1996 | Maase et al. | 356/71 |
| 5,548,394 A | 8/1996 | Giles et al. | 356/71 |
| 5,591,949 A | 1/1997 | Bernstein | 235/380 |
| 5,596,454 A | 1/1997 | Hebert | 359/726 |
| 5,598,474 A | 1/1997 | Johnson | 713/186 |
| 5,613,014 A | 3/1997 | Eshera et al. | 382/124 |
| 5,615,277 A | 3/1997 | Hoffman | 382/115 |
| 5,625,448 A | 4/1997 | Ranalli et al. | 356/71 |
| 5,640,422 A | 6/1997 | Johnson | 375/259 |
| 5,649,128 A | 7/1997 | Hartley | 710/305 |
| 5,650,842 A | 7/1997 | Maase et al. | 356/71 |
| 5,661,451 A | 8/1997 | Pollag | 340/426.26 |
| 5,680,205 A | 10/1997 | Borza | 356/71 |
| 5,689,529 A | 11/1997 | Johnson | 375/259 |
| 5,717,777 A | 2/1998 | Wong et al. | 382/124 |
| 5,726,443 A | 3/1998 | Immega et al. | 250/227.2 |
| 5,729,334 A | 3/1998 | Van Ruyven | 356/71 |
| 5,736,734 A | 4/1998 | Marcus et al. | 250/225 |
| 5,745,684 A | 4/1998 | Oskouy et al. | 709/250 |
| 5,748,766 A | 5/1998 | Maase et al. | 382/124 |
| 5,748,768 A | 5/1998 | Sivers et al. | 382/130 |
| 5,755,748 A | 5/1998 | Borza | 607/61 |
| 5,757,278 A | 5/1998 | Itsumi | 340/5.83 |
| 5,767,989 A | 6/1998 | Sakaguchi | 358/474 |
| 5,778,089 A | 7/1998 | Borza | 382/124 |
| 5,781,647 A | 7/1998 | Fishbine et al. | 382/100 |
| 5,793,218 A | 8/1998 | Oster et al. | 324/754 |
| 5,796,857 A * | 8/1998 | Hara | 382/124 |
| 5,801,681 A | 9/1998 | Sayag | 345/157 |
| 5,805,777 A | 9/1998 | Kuchta | 358/1.13 |
| 5,809,172 A | 9/1998 | Melen | 382/232 |
| 5,812,067 A | 9/1998 | Bergholz et al. | 340/5.52 |
| 5,815,252 A | 9/1998 | Price-Francis | 356/71 |
| 5,818,956 A | 10/1998 | Tuli | 382/126 |
| 5,822,445 A | 10/1998 | Wong | 382/127 |
| 5,825,005 A | 10/1998 | Behnke | 235/380 |
| 5,825,474 A | 10/1998 | Maase | 356/71 |
| 5,828,773 A | 10/1998 | Setlak et al. | 382/126 |
| 5,832,244 A | 11/1998 | Jolley et al. | 710/305 |
| 5,848,231 A | 12/1998 | Teitelbaum et al. | 713/200 |
| 5,855,433 A | 1/1999 | Velho et al. | 382/162 |
| 5,859,420 A | 1/1999 | Borza | 250/208.1 |
| 5,859,710 A | 1/1999 | Hannah | 358/296 |
| 5,862,247 A | 1/1999 | Fisun et al. | 382/116 |
| 5,867,802 A | 2/1999 | Borza | 340/552 |
| 5,869,822 A | 2/1999 | Meadows, II et al. | 235/380 |
| 5,872,834 A | 2/1999 | Teitelbaum | 379/93.03 |
| 5,892,599 A | 4/1999 | Bahuguna | 359/15 |
| 5,900,993 A | 5/1999 | Betensky | 359/710 |
| 5,907,627 A | 5/1999 | Borza | 382/124 |
| 5,920,384 A | 7/1999 | Borza | 356/71 |
| 5,920,640 A | 7/1999 | Salatino et al. | 382/124 |
| 5,926,555 A | 7/1999 | Ort et al. | 382/124 |
| 5,928,347 A | 7/1999 | Jones | 710/305 |
| 5,942,761 A | 8/1999 | Tuli | 250/556 |
| 5,946,135 A | 8/1999 | Auerswald et al. | 359/529 |
| 5,960,100 A | 9/1999 | Hargrove | 382/124 |
| 5,973,731 A | 10/1999 | Schwab | 348/161 |
| 5,974,162 A | 10/1999 | Metz et al. | 382/124 |
| 5,987,155 A | 11/1999 | Dunn et al. | 382/116 |
| 5,991,467 A | 11/1999 | Kamiko | 382/312 |
| 5,995,014 A | 11/1999 | DiMaria | 340/5.52 |
| 5,999,307 A | 12/1999 | Whitehead et al. | 359/298 |
| 6,000,224 A | 12/1999 | Foye | 62/3.2 |
| 6,002,787 A * | 12/1999 | Takhar et al. | 382/125 |
| 6,018,739 A | 1/2000 | McCoy et al. | 707/102 |
| 6,023,522 A | 2/2000 | Draganoff et al. | 382/124 |
| 6,038,332 A | 3/2000 | Fishbine et al. | 382/115 |
| 6,041,372 A | 3/2000 | Hart et al. | 710/62 |
| 6,055,071 A | 4/2000 | Kuwata et al. | 358/501 |
| 6,064,398 A | 5/2000 | Ellenby et al. | 345/633 |
| 6,064,753 A | 5/2000 | Bolle et al. | 382/125 |
| 6,064,779 A | 5/2000 | Neukermans et al. | 382/313 |
| 6,072,891 A | 6/2000 | Hamid et al. | 382/116 |

| | | | |
|---|---|---|---|
| 6,075,876 A | 6/2000 | Draganoff | 382/124 |
| 6,078,265 A | 6/2000 | Bonder et al. | 340/5.23 |
| 6,088,585 A | 7/2000 | Schmitt et al. | 455/411 |
| 6,097,873 A | 8/2000 | Filas et al. | 385/140 |
| 6,104,809 A | 8/2000 | Berson et al. | 713/186 |
| 6,115,484 A | 9/2000 | Bowker et al. | 382/127 |
| 6,122,394 A | 9/2000 | Neukermans et al. | 382/124 |
| 6,144,408 A | 11/2000 | MacLean | 348/241 |
| 6,150,665 A | 11/2000 | Suga | 250/556 |
| 6,154,285 A | 11/2000 | Teng et al. | 356/445 |
| 6,162,486 A | 12/2000 | Samouilhan et al. | 427/1 |
| 6,166,787 A | 12/2000 | Akins et al. | 349/57 |
| 6,178,255 B1 | 1/2001 | Scott et al. | 382/124 |
| 6,195,447 B1 | 2/2001 | Ross | 382/125 |
| 6,198,836 B1 | 3/2001 | Hauke | 382/125 |
| 6,204,331 B1 | 3/2001 | Sullivans et al. | 525/221 |
| 6,240,200 B1 | 5/2001 | Wendt et al. | 382/127 |
| 6,259,108 B1 | 7/2001 | Antonelli et al. | 250/556 |
| 6,272,562 B1 | 8/2001 | Scott et al. | 710/16 |
| 6,281,931 B1 | 8/2001 | Tsao et al. | 348/247 |
| 6,282,302 B1 | 8/2001 | Hara | 382/116 |
| 6,327,047 B1 | 12/2001 | Motamed | 358/1.15 |
| 6,347,163 B2 | 2/2002 | Roustaei | 382/314 |
| 6,355,937 B2 | 3/2002 | Antonelli et al. | 250/556 |
| 6,404,904 B1 | 6/2002 | Einighammer et al. | 382/124 |
| 6,414,749 B1 | 7/2002 | Okamoto et al. | 356/71 |
| 6,444,969 B2 | 9/2002 | Johnson | 250/208.1 |
| 6,485,981 B1 | 11/2002 | Fernandez | 436/71 |
| 6,643,390 B1 | 11/2003 | Clark et al. | 382/124 |
| 6,687,391 B1 | 2/2004 | Scott et al. | 382/126 |
| 6,809,303 B2 | 10/2004 | Carver et al. | 219/543 |
| 6,872,916 B2 | 3/2005 | Carver et al. | 219/201 |
| 6,954,260 B2 | 10/2005 | Arnold et al. | 356/71 |
| 2001/0033677 A1 | 10/2001 | Scott et al. | 382/124 |
| 2001/0036301 A1 | 11/2001 | Yamaguchi et al. | 382/125 |
| 2001/0040988 A1 | 11/2001 | Takahashi | 382/124 |
| 2002/0030668 A1 | 3/2002 | Hoshino et al. | 345/175 |
| 2002/0106115 A1 | 8/2002 | Rajbenbach et al. | 382/126 |
| 2003/0012417 A1 | 1/2003 | Hamid | 382/124 |
| 2003/0016427 A1 | 1/2003 | Arnold et al. | 359/222 |
| 2003/0089702 A1 | 5/2003 | Carver et al. | 219/543 |
| 2003/0089703 A1 | 5/2003 | Carver et al. | 219/543 |
| 2003/0133103 A1 | 7/2003 | Arnold et al. | 356/237.2 |
| 2003/0133143 A1 | 7/2003 | McClurg et al. | 358/1.14 |

FOREIGN PATENT DOCUMENTS

| | | |
|---|---|---|
| EP | 0 308 162 | 3/1989 |
| EP | 0 379 333 A1 | 7/1990 |
| EP | 0 623 890 A3 | 11/1994 |
| EP | 0 650 137 A2 | 4/1995 |
| EP | 0 650 137 A3 | 4/1995 |
| EP | 0 653 882 A1 | 5/1995 |
| EP | 0 379 333 B1 | 7/1995 |
| EP | 0 889 432 A2 | 1/1999 |
| EP | 0 905 646 A1 | 3/1999 |
| EP | 0 785 750 B1 | 6/1999 |
| EP | 0 924 656 A2 | 6/1999 |
| EP | 0 623 890 B1 | 8/2001 |
| GB | 2 089 545 A | 6/1982 |
| GB | 2 313 441 A | 11/1997 |
| JP | 62-212892 | 9/1987 |
| JP | 63-137206 | 6/1988 |
| JP | 1-205392 | 8/1989 |
| JP | 3-161884 | 7/1991 |
| JP | 3-194674 | 8/1991 |
| JP | 3-194675 | 8/1991 |
| JP | 0 623 890 A2 | 11/1994 |
| JP | 11-225272 A | 8/1999 |
| JP | 11-289421 A | 10/1999 |
| RU | 1769854 A1 | 10/1992 |
| WO | WO 87/02491 A1 | 4/1987 |
| WO | WO 90/03620 | 4/1990 |
| WO | WO 92/11608 A1 | 7/1992 |
| WO | WO 94/22371 | 10/1994 |
| WO | WO 96/17480 A2 | 6/1996 |
| WO | WO 96/17480 A3 | 6/1996 |
| WO | WO 97/29477 A1 | 8/1997 |
| WO | WO 97/41528 A1 | 11/1997 |
| WO | WO 98/09246 | 3/1998 |
| WO | WO 98/12670 A1 | 3/1998 |
| WO | WO 99/12123 A1 | 3/1999 |
| WO | WO 99/26187 A1 | 5/1999 |
| WO | WO 99/40535 | 8/1999 |

OTHER PUBLICATIONS

Btt (Biometric Technology Today), Finger technologies contacts, 2 pages.
Drake, M.D. et al., "Waveguide hologram fingerprint entry device," *Optical Engineering*, vol. 35, No. 9, Sep. 1996, pp. 2499-2505.
*Ultra-Scan Corporation Home Page* (visited May 20, 1999) <http://www.ultra-scan.com/index.htm>, 3 pages. (discusses technology as early as 1996).
*ID-Card System Technical Specifications* (last updated Jul. 18, 1998) <http://dermalog.de/Britain/Products/ID-Card/idcard2.htm>, 2 pages.
*Fujitsu Limited Products and Services* (updated Apr. 21, 1999) <http://www.fujitsu.co.jp/hypertext/Products/index-e.html>, 3 pages, Copyright 1995-1999.
*SonyDCam* (visited May 20, 1999) <http://www.microsoft.com/DDK/ddkdocs/Win2k/sonydcam.htm>, 3 pages, Copyright 1999.
*Verid Fingerprint Verification* (visited May 17, 1999) <http://www.tssi.co.uk/products/finger.html>, 2 pages.
*SAC Technologies Showcases Stand-Alone SAC-Remote(TM)* (visited May 18, 1999) <http://www.pathfinder.com/money/latest/press/PW/1998Mar25/1026.html>, 2 pages.
"Biometrics, The Future Is Now," www.securitymagazine.com, May 1999, pp. 25-26.
*Mytec Technologies Gateway*, (visited Apr. 27, 1999) <http://www.mytec.com/Products/gateway/>, 1 page.
*Mytec Technologies Gateway: Features & Benefits*, (visited Apr. 27, 1999) <http://www.mytec.com/Products/gateway/features.htm>, 1 page.
*Mytec Technologies Touchstone Pro*, (visited Apr. 27, 1999) <http://www.mytec.com/Products/Touchstone/>, 1 page.
*Mytec Technologies Touchstone Pro: Features*, (visited Apr. 27, 1999) <http://www.mytec.com/Products/Touchstone/features.htm>, 1 page.
*Electronic Timeclock Systems and Biometric Readers* (last updated Apr. 17, 1999) <http://www.lfs-hr-bene.com/tclocks.html>, 1 page.
*Fingerprint Time Clock* (visited May 17, 1999) <http://www.lfs-hr-bene.com/Biometrics/Fingerprintclock.html>, 6 pages.
*KC-901: The KSI fingerprint sensor* (visited May 17, 1999) <http://www.kinetic.bc.ca/kc-901.html>, 3 pages.
*Intelnet Inc.* (visited May 20, 1999) <http://www.intelgate.com/index.html>, 1 page, Copyright 1996.
*Ver-i-fus® Configurations* (visited May 20, 1999) <http://www.intelgate.com/verconfig.htm>, 1 page. (Ver-i-fus product released in 1995).
*Ver-i-Fus® & Ver-i-Fus<sup>mil</sup>®* (visited May 20, 1999) <http://www.intelgate.com/vif_data.htm>, 3 pages (Ver-i-fus product released in 1995).
*Access Control System Configurations* (visited May 20, 1999) <http://www.intelgate.com/access.htm>, 2 pages. (Ver-i-fus product released in 1995).
*Company* (visited May 17, 1999) <http://www.instainfo.com.company.htm>, 2 pages.
*TouchLock™ II Fingerprint Identity Verification Terminal* (visited May 17, 1999) <http://www.identix.com/TLock.htm>, 4 pages.
*Physical Security and Staff Tracking Solutions* (visited May 17, 1999) <http://www.identix.com/products/biosecurity.html>, 3 pages, Copyright 1996-1998.
*Veriprint Product Applications* (visited Apr. 27, 1999) <http://www.biometricid.com/uses.htm>, 1 page, Copyright 1999.
*BII Home Page* (visited Apr. 27, 1999) <http://www.biometricid.com/homepage.htm>, 1 page, Copyright 1999.
Randall, N., "A Serial Bus on Speed," *PC Magazine*, May 25, 1999, pp. 201-203.

*The DERMALOG Check-ID* (visited Nov. 12, 1999) <http://www.dermalog.de/ganzneu/products_check.html>, 1 page.
*Check-ID Specifications and Features* (visited Nov. 12, 1999) <http://www.dermalog.de/ganzneu/spec_check.html>, 1 page, Copyright 1999.
*Time is Money?* (visited Jun. 5, 1998) <http://www.iaus.com/afim.htm>, 3 pages.
*Welcome to the Homepage of Helmann Biometric Systems GMBH* (visited Jun. 4, 1998) <http://www.hbs-jena.com/>, 1 page, Copyright 1998.
*Helmann Biometric Systems Corporate Overview* (visited Jun. 4, 1998) <http://www.hbs-jena.com/company.htm>, 4 pages, Copyright 1998.
True-ID® The LiveScan with special "ability". . . , 2 pages.
*Printrak International: User List* (visited Jun. 3, 1998) <http://www.printrakinternational.com and links>, 10 pages, Copyright 1996.
*TouchPrint™ 600 Live-Scan System* (visited Nov. 17, 1999) <http://www.identix.com/products/livescan.htm>, 4 pages, Copyright 1996-1998.
Fingerscan V20, Identix Incorporated, 1 page, Copyright 1999.
*Startek's Fingerprint Verification Products* (visited Nov. 17, 1999) <http://www.startek.com.tw/product/index.html>, 1 page.
*Introduction to Startek's Fingerprint Verfication Products* (visited Nov. 17, 1999) <http://www.startek.com.tw/product/index2.html>, 2 pages.
*Automatic Fingerprint Identification Systems* (visited Nov. 17, 1999) <http://www.sagem.com/en/produit4-en/emprelnte-dig-en.htm>, 1 page.
*Digital Biometrics Corporate Information* (visited Nov. 17, 1999) <http://www.digitalbiometrics.com/Corporate_info/Corporate_info.htm>, 2 pages. (discusses technology as early as 1985).
*DBI Live-Scan Products: Digital Biometrics TENPRINTER* (visited Nov. 17, 1999) <http://www.digitalbiometrics.com/products/tenprinter.htm>, 4 pages. (Tenprinter released in 1996).
*DBI Live-Scan Products: Networking Options* (visited Nov. 17, 1999) <http://www.digitalbiometrics.com/products/networking_options.htm>, 3 pages.
*DBI Live-Scan Products: Digital Biometrics FingerPrinter CMS* (visited Nov. 17, 1999) <http://www.digitalbiometrics.com/products/FingerPrinterCMS.htm>, 3 pages. (CMS released in 1998).
*DBI Live-Scan Products: Image Printer Stations* (visited Nov. 17, 1999) <http://www.digitalbiometrics.com/products/imageprinter.htm>, 2 pages.
*DBI Live-Scan Products: FC-21 Fingerprint Capture Station* (visited Nov. 17, 1999) <http://www.digitalbiometrics.com/products/Fingerprintcapture.htm>, 2 pages.
*Series 400 OEM Scanner* (visited Nov. 17, 1999) <http://www.ultra-scan.com/400.htm>, 3 pages. (Scanner released in 1996).
*USC Scanner Design* (visited Nov. 17, 1999) <http://www.ultra-scan.com/scanner.htm>, 4 pages. (Scanner released in 1996).
*Series 500/600 Scanners* (visited Nov. 17, 1999) <http://www.ultra-scan.com/500.htm>, 3 pages. (Scanner released in 1996).
*Series 700 ID Station* (visited Nov. 17, 1999) <http://www.ultra-scan.com/700.htm>, 3 pages. (Scanner released in 1998).
*Identix: The Corporation* (visited Nov. 17, 1999) <http://www.identix.com/corporate/home.htm>, 2 pages, Copyright 1996-1998.
*Biometric Imaging Products* (visited Nov. 17, 1999) <http://www.identix.com/products/bioimage.htm>, 1 page, Copyright 1996-1998.
*TouchPrint™ 600 Palm Scanner* (visited Nov. 17, 1999) <http://www.identix.com/products/palmscan.htm>, 3 pages, Copyright 1996-1998.
*TouchPrint™ 600 Card Scan System* (visited Nov. 17, 1999) <http://www.identix.com/products/cardscan.htm>, 3 pages, Copyright 1996-1998.
*Dermalog Key—The safest and easiest way of access control* (Last updated Jul. 18, 1998) <http://www.dermalog.de/Britain/Products/Key/key.htm>, 1 page.
*Dermalog Finger-ID Your small size solution for high security* (Last updated Jul. 18, 1998) <http://www.dermalog.de/Britain/Products/Finger/fingerid.htm>, 1 page.
*Mytec: Corporate* (visited Nov. 17, 1999) <http://www.mytec.com/corporate/>, 2 pages.
*Kinetic Sciences Inc. Fingerprint Biometrics Division* (visited Nov. 17, 1999) <http://www.kinetic.bc.ca/main-FPB.html>, 1 page.

*Secugen Unveils Fully Functional Fingerprint Recognition Solutions*, May 11, 1999, (visited Nov. 17, 1999) <http://www.secugen.com/pressrel.htm>, 3 pages.
*SecureTouch PV—A Personal "Password Vault"* (visited Nov. 17, 1999) <http://www.biometricaccess.com/securetouch_pv.htm>, 1 page.
*Digital Descriptor Systems, Inc.-Profile* (visited Nov. 17, 1999) <http://www.ddsi-cpc.com/pages/profile.html>, 3 pages.
*Corporate Profile* (visited Nov. 17, 1999) <http://www.printrakinternational.com/corporate.htm>, 1 page.
*Printrak Products* (visited Nov. 17, 1999) <http://www.printrakinternational.com/Products.htm>, 1 page. (Discusses technology as early as 1974).
Verifier™ 500 Fingerprint Capture Devices, Cross Match Technologies, Inc., 2 pages, 1998.
Biometric terminal, 1 page.
*Cross Match Technologies, Inc.* (visited Mar. 25, 1999) <http://www.crossmatch.net/>, 1 page.
*Cross Match Technologies, Inc.—Products Overview* (visited Mar. 25, 1999) <http://www.crossmatch.net/new/products/product-index.html>, 1 page.
*Cross Match Technologies, Inc.—Law Enforcement Systems* (visited Mar. 25, 1999) <http://www.crossmatch.net/new/law/law-index.html>, 2 pages.
*Cross Match Technologies, Inc.—Commerical Systems: Building On The Standard* (visited Mar. 25, 1999) <http://www.crossmatch.net/new/commercial/commercial-index.html>, 2 pages.
*Cross Match Technologies, Inc.—International Sales* (visited Mar. 25, 1999) <http://www.crossmatch.net/new/sales/sales-index.html>, 1 page.
*Cross Match Technologies, Inc.—Support* (visited Mar. 25, 1999) <http://www.crossmatch.net/new/support/support-index.html>, 1 page.
"Command Structure for a Low-Cost (Primitive) Film Scanner," *IBM Technical Disclosure Bulletin*, IBM Corp., vol. 35, No. 7, Dec. 1992, pp. 113-121.
*Fingerprint Scan API Toolkit Version 1.x Feature List* (Apr. 26, 2000) <http://www.mentalix.com/api/archive_fapivl.htm>, 3 pages.
"Image Acquisition System," *IBM Technical Disclosure Bulletin*, IBM Corp., vol. 29, No. 5, Oct. 1986, pp. 1928-1931.
Kunzman, Adam J. and Wetzel, Alan T., "1394 High Performance Serial Bus: The Digital Interface for ATV," *IEEE Transaction on Consumer Electronics*, IEEE, vol. 41, No. 3, Aug. 1995, pp. 893-900.
Sluijs, F. et al., "An On-chip USB-powered Three-Phase Up/down DC/DC Converter in a Standard 3.3V CMOS Process," *2000 IEEE International Solid-State Circuits Conference*, IEEE, Feb. 9, 2000, pp. 440-441.
Venot, A. et al., "Automated Comparison of Scintigraphic Images," *Journal of Nuclear Medicine*, vol. 27, No. 8, Aug. 1986, pp. 1337-1342.
English-language Abstract for Japanese Patent Publication No. 59-103474, published Jun. 14, 1984, printed from espacenet.com, 1 page.
English-language Abstract for Japanese Patent Publication No. 10-262071, published Sep. 29, 1998, printed from espacenet.com, 1 page.
English-language Abstract for Japanese Patent Publication No. 11-167630, published Jun. 22, 1999, printed from espacenet.com, 1 page.
English-language Abstract for Japanese Patent Publication No. 11-225272, published Aug. 17, 1999, printed from espacenet.com, 1 page.
English-language Abstract for Japanese Patent Publication No. 11-252489 published Sep. 17, 1999, printed from espacenet.com, 1 page.
English-language Abstract for Japanese Patent Publication No. 11-289421, published Oct. 19, 1999, printed from espacenet.com, 1 page.
International Search report for PCT/US0301168, dated Mar. 6, 2000, 6 pgs.

Singh et al., "Determination of the Hand From Single Digit Finger Print," Proc. 14th IAFS, Aug. 1996, pp. 167-179.

Shen et al., "Quality Measures of Fingerprint Images," Lecture Notes in Computer Science, Springer Verlag, New York, NY US, vol. 2091, Jun. 6, 2001, pp. 266-271.

International Search Report for Appln. No. PCT/US03/01168, mailed Sep. 30, 2003, 5 pages.

U.S. Appl. No. 10/050,046, filed Jan. 17, 2002, Arnold et al.

English-language Abstract of Japanese Patent Publication No. 01-205392, from http://www1.ipdl.jpo.go.jp/PA1/result/detail/main/wAAAa28662DA401205392P1.htm, 1 Page (Aug. 17, 1989—Date of publication of application).

English-language Abstract for Japanese Patent Publication No. 03-161884, from http://www1.ipdl.jpo.go.jp/PA1/result/detail/main/wAAAa12247DA403161884P1.htm, 2 Pages (Jul. 11, 1991—Date of publication of application).

English-language Abstract of Japanese Patent Publication No. 03-194674, from http://www1.ipdl.jpo.go.jp/PA1/result/detail/main/wAAAa03947DA03194674P1.htm, 2 Pages (Aug. 26, 1991—Date of publication of application).

English-language Abstract for Japanese Patent Publication No. 03-194675, from http://www1.ipdl.jpo.go.jp/PA1/result/detail/main/wAAAa09356DA403194675P1.htm, 2 Pages (Aug. 26, 1991—Date of publication of application).

English-language Abstract of Japanese Patent Publication No. 62-212892, from http://www1.ipdl.jpo.go.jp/PA1/result/detail/main/wAAAa29680DA362212892P1.htm, 1 Page (Sep. 18, 1987—Date of publication of application).

*Veriprint 2000—Fingerprint Verification Terminal for Use with Jantek Time & Attendance Software*, Biometric Identification Inc., <http://www.hunterequipment.com/fingerprint.htm>, 2 pages (visited May 17, 1999).

*Veriprint 2100, Stand-Alone Fingerprint Verification Terminal*, Biometric Identification Inc., <http://www.biometricid.com/veriprint2100.htm>, 3 pages (visited Apr. 27, 1999).

*ID 1000™ 10-PrintLive Scan System*, Cross Match Technologies, Inc., Copyright 2000, 2 pages.

*ID 1000™ Portable Live Scan System*, Cross Match Technologies, Inc., Copyright 1999, 4 pages.

*ID 1500™ Palm Print Live Scan System*, Cross Match Technologies, Inc. Copyright 2000, 2 pages.

Proposed National Plan—Flat Fingerprint Based Applicant Background Checks (Draft), *Public Safety Strategy Subcommittee*, Jan. 21, 2001, p. 1-5 and A-1 through A-12.

*A.F.I.S.*, DERMALOG, (last updated Apr. 2, 1998), <http://www.dermalog.de/afis.htm>, 2 pages (last visited Jun. 3, 1998).

*DBI FingerPrinter CMS*, Digital Biometrics, Inc., 4 pages (publication date unknown, copy available prior to Jan. 16, 2003).

*Systems for Live-Scan Fingerprinting*, Digital Biometrics, Inc., 1998, 7 pages.

*Global Security Fingerscan™ System Overview*, <http://www.u-net.com/mbp/sol/g/a9.htm>, Fujitsu Australia Limited, 1995, 12 pages (visited Nov. 1, 2000).

*Fujitsu Fingerprint Recognition Device (FPI-550)*, <http://www.iosoftwave.com/biosols/fujitsu/fpi550.htm>, 2 pages (visited Nov. 17, 1999).

*LS 1 LiveScan Booking Workstation High Performance Finger & Palm Scanning System*, <http://www.hbs-jena.com/is1.htm>, Copyright 1998, HBS GmbH, 6 pages (visited Jun. 4, 1998).

*Mentalix Provides The First IAFIS-Certified Latent Print Scanning Solution For Windows®*, Jul. 23, 1999, <http://webhost.mentalix.com/pressreleases/fprintplook3_prel.htm>, 2 pages (visited Nov. 18, 2002).

*Mitsubishi MyPass LP-1002*, <http://www.iosoftware.com/biosols/mitsubishi/mypass.htm>, 2 pages (visited Nov. 17, 1999).

*Morpho DigiScan Cellular*, <http://www.morpho.com/products/law_enforcement/digiscan/cellular.htm>, Copyright 1998, Sagem Morpho, Inc., 2 pages (visited Jun. 3, 1998).

*Morpho FlexScan Workstation*, <http://www.morpho.com/products/law_enforcement/flexscan/>, Copyright 1998, Sagem Morpho, Inc., 2 pages (visited Jun. 3, 1998).

*POLLEX Technology Ltd., The Expert in Fingerprint Identification—POLLog*, <http://www.pollex.ch/english/products/pollog.htm>, 2 pages (visited Nov. 17, 1999).

*Press Release: Printrak International Announces New Portable Fingerprint ID Solution*, Dec. 10, 1996, <http://www.scott.net/~dh/25.htm>, 3 pages (visited Nov. 17, 1999).

*Profile*, (last updated Aug. 16, 1998), <http://www.dermalog.de/Britain/Profile/profile.htm>, 3 pages (visited May 20, 1999).

*Remote Access Positive IDentification—raPID*, <http://www.nec.com/cgi-bin/showproduct.exe?pro . . . emote+Access+Positive+IDentification+%2D+raPID>, Copyright 1997, NEC USA, Inc., 2 pages (visited Jun. 3, 1998).

Response to Request for Information, Cross Match Technologies, Inc., 13 pages, Apr. 16, 1999.

Roethenbaugh, G. (ed), *Biometrics Explained*, ICSA, 1998, pp. 1-34.

*Press Releases: Fingerprint Biometrics: Securing the Next Generation*, <http://www.secugen.com/pressrel.htm>, May 19, 1999, 4 pages (visited Nov. 17, 1999).

*Sony Fingerprint Identification Unit, Self-Contained Fingerprint Recognition Device*, <http://www.iosoftware.com/biosots/sony/flu/index.htm>, 3 pages (visited Nov. 17, 1999).

*Sony Fingerprint Identification Terminal, Fingerprint Recognition Device and Smart Card Reader*, <http://www.iosoftware.com/biosols/sony/flu/applications/fit100.htm>, 2 pages (visited Nov. 17, 1999).

*Sony Fingerprint Identification Unit (FIU-700)*, <http://www.iosoftware.com/biosols/sony/flu700/index.htm>, 2 pages (visited Nov. 17, 1999).

*Startek's Fingerprint Verification Products (online): FingerGuard FG-40*, <http://www.startek.com.tw/product/fg40/fg40.html>, 3 pages (visited May 18, 1999).

*Startek's Fingerprint Verification Products (online): FingerFile 1050*, <http://www.startek.com.tw/product/ff1050/ff1050.html>, 3 pages (visited Oct. 8, 1999).

*Live-Scan Products—Tenprinter® 1133S*, Digital Biometrics, Inc., <http://www.digitalbiometrics.com/Products/tenprinter.htm, 4 pages (visited Apr. 23, 1999).

*10-Print Imaging System*, Cross Check Corporation, 1998, 2 pages.

*TouchPrint™ 600 Live-Scan Systems*, <http://www.identix.com/products/livescan.htm>, Copyright 1996-98, Identix Incorporated, 4 pages (visited Apr. 23, 1999).

*Verid® Fingerprint Reader*, TSSI, 4 pages (publication date unknown, copy available prior to Jan. 16, 2003).

*Verifier™ 200—Fingerprint Capture Devices*, Cross Match Technologies, Inc., 2 pages (1999).

*Verifier 200—Direct Fingerprint Reader*, Cross Check Corporation, 2 pages (1999).

*Verifier™ 250—Fingerprint Capture Devices*, Cross Match Technologies, Inc., 2 pages (1999).

*Verifier 250—Small Footprint Direct Fingerprint Reader*, Cross Check Corporation, 2 pages (1999).

*Verifier™ 290—Fingerprint Capture Devices*, Cross Match Technologies, Inc., 2 pages (1999).

*Verifier 290—Direct Rolled Fingerprint Reader*, Cross Check Corporation, 2 pages (1999).

*Press Releases*Cross Match Technologies, Inc., <http://www.crossmatch.net/new/news/news-pr-050798.html>, 1 page (visited Mar. 25, 1999).

*Ver-i-Fus Fingerprint Access Control Systems*, <http://www.intelgate.com/verifus.htm>, 2 pages (visited May 20, 1999).

English-language Abstract of Japanese Patent Publication No. 10-079017, from http://www19.ipdl.ipo.go.jp/PA1/result/detail/main/wAAAK2aaCRDA410079017P1.htm, 2 pages (Mar. 24, 1998—Date of publication of application).

* cited by examiner

BIOMETRIC IMAGING SYSTEM AND METHOD

CROSS-REFERENCE TO RELATED APPLICATIONS

The present application claims the benefit of U.S. Provisional Patent Application No. 60/348,678, filed on Jan. 17, 2002, which is incorporated by reference herein in its entirety.

The present application is related to U.S. patent application Ser. No. 10/345,366, filed concurrently herewith, which is incorporated by reference herein in its entirety.

The present application is related to U.S. patent application Ser. No. 10/050,046, filed Jan. 17, 2002 (now U.S. Pat. No. 6,954.260 that issued Oct. 11. 2005), and entitled "Systems and Methods For Illuminating A Platen In A Print Scanner," and U.S. patent application Ser. No. 10/047,983, filed on Jan. 17, 2002 (now U.S. Pat. No. 6,809,303 that issued Oct. 26, 2004), and entitled "Platen Heaters For Biometric Image Capturing Devices," which are both incorporated by reference herein in their entireties.

BACKGROUND OF THE INVENTION

1. Field of the Invention

The present invention is generally related to biometric imaging systems. More particularly, the present invention is related to a fingerprint imaging system.

2. Background Art

Biometrics is a science involving the analysis of biological characteristics. Biometric imaging captures a measurable characteristic of a human being for identity purposes. Print capture and recognition is an important biometric technology. Law enforcement, banking, voting, and other industries increasingly rely upon prints as a biometric to store, recognize or verify identity. See, e.g., Gary Roethenbaugh, *Biometrics Explained*, International Computer Security Association, Inc., pp. 1–34, (1998), which is incorporated herein by reference in its entirety. Generally, a biometric is a measurable, physical characteristic or personal behavior trait used to recognize the identity, or verify the claimed identity, of a person who has a biometric reference template (e.g., data that represents a biometric measurement) on file.

One type of biometric imaging system is an Automatic Fingerprint Identification System (AFIS). Automatic Fingerprint Identification Systems can be used for law enforcement purposes to collect print images from criminal suspects when they are arrested.

One type of AFIS input device is a ten-print scanner. Typically, ten-print scanners require each finger to be imaged using a roll print technique. Each finger is identified prior to imaging (e.g., right hand thumb, right hand ring finger, left hand middle finger, etc). This enables the device to know whether the left or right hand is being imaged and to know where to place the imaged print on a fingerprint card. Unfortunately, the process of rolling each finger to obtain prints during an arrest or background check is a relatively complex and time consuming process. Also, tenprint scanners are usually custom-made consoles. Such consoles contain built-in equipment, such as a monitor, a keyboard, a pointing device, and at least one processor for processing and viewing fingerprint images. Custom-made consoles are very expensive and are manufactured at low volume rates. Custom-made consoles are also burdened with high maintenance costs. When the console malfunctions, the entire system is inoperable.

What is needed is a fingerprint workstation that can capture plain impression fingerprints. What is also needed is an affordable fingerprint workstation with reduced complexity relative to a conventional rolled print workstation, which can provide data and fingerprint image integrity based on Federal Bureau of Investigation (FBI) certification standards. What is further needed is a fingerprint workstation that can: capture up to four simultaneous fingerprint impressions as a single image, segment the single image to create four separate images, and automatically determine whether the single image is a left or right hand image.

BRIEF SUMMARY OF THE INVENTION

Embodiments of the present invention provide a ten-print plain impression fingerprint workstation system and method that can ensure data and fingerprint image integrity and adhere to FBI certification standards. The system and method can be used to capture up to four simultaneous fingerprint impressions as a single image and segment the single image to create four separate images. The system and method also can distinguish whether fingerprint impressions from a left or right hand were captured.

Embodiments of the present invention are directed to a ten-print plain impression fingerprint scanner system and method. The ten-print scanner has a finger guide and a platen that assists in positioning four finger slaps onto the platen. The ten-print scanner also includes at least four indicators that provide real-time feedback for each finger of a fingerprint image of the four finger slaps. In another embodiment of the present invention, the ten-print scanner can be a part of a fingerprint workstation. The fingerprint workstation also includes a computer that is interfaced to the ten-print scanner via a communication link.

Embodiments of the present invention provide a method including scanning a print image, processing the scanned image, and separating the processed image into individual fingerprint images. The method also includes comparing the print image to a previously scanned print image, quality classifying the separated images, indicating a quality classification of the print image based on the quality classifying step, and determining whether the print image is of a good quality.

Embodiments of the present invention provide a method including scanning a print image, filtering the print image, binarizing the filtered image. The method also includes detecting a fingerprint area based on the binarized image, detecting a fingerprint shape based on the binarized image, and determining whether the fingerprint area and shape are acceptable.

Embodiments of the present invention provide a method for processing fingerprints including scanning a print image of at least one finger placed on a platen and determining whether the scanned print image includes data representative of at least one finger positioned at a diagonal relative to a section of the platen.

Embodiments of the present invention provide a system including a platen that receives a finger or thumb, a scanner that scans the finger or thumb on the platen, and a processor that processes the scanned image. The system also includes a separator that separates the processed image into individual fingerprint images and a comparator that compares the print image to a previously scanned print image. The system further includes a quality classifier that quality classifies the separated images and an output device that indicates a quality classification of the print image based on the classifier. The system further includes an image quality determining device that determines whether the print image is of a good quality.

Further embodiments, features, and advantages of the present invention, as well as the structure and operation of the various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art(s) to make and use the invention.

Figure 1A:
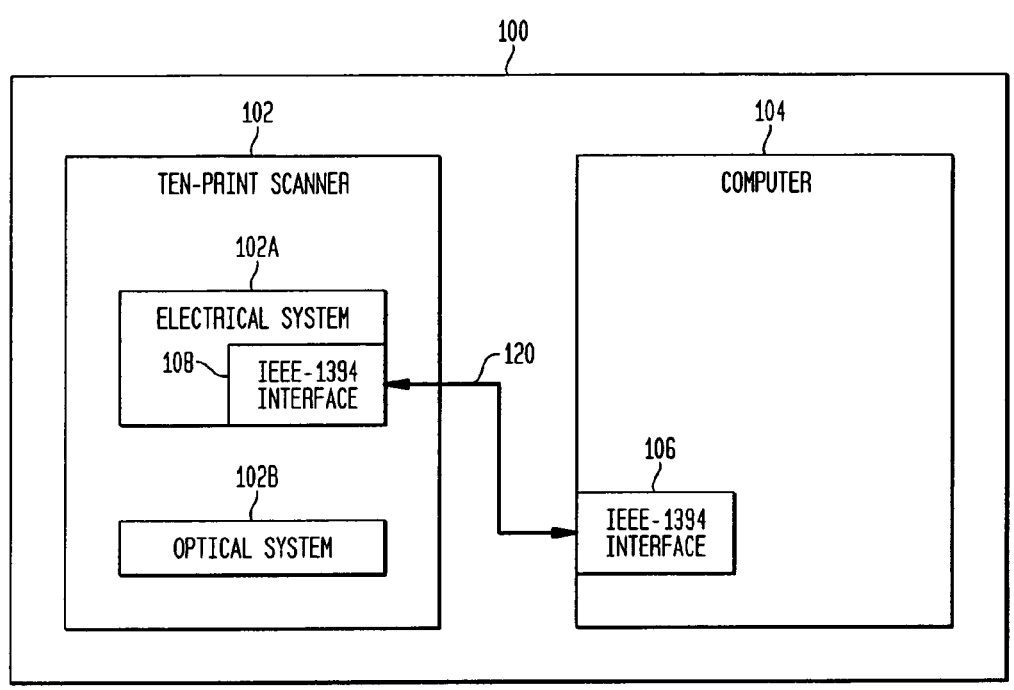
FIG. 1A shows a fingerprint workstation according to an embodiment of the present invention.

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art(s) with access to the teachings provided herein will recognize additional modifications, applications, and embodiments within the scope thereof and additional fields in which the present invention would be of significant utility.

Sections

Terminology
Overview
The Electrical System
The Optical System
Finger Guide and Platen
Real-Time Feedback Quality Indicators
Overall Method of Capturing and Processing Prints
Method for Determining Quality of Captured Fingerprints
Slap Image Processing
Left Hand/Right Hand Determination
Print Images
Overall System Terminology To more clearly delineate the present invention, an effort is made throughout the specification to adhere to the following term definitions consistently.

The term "finger" refers to any digit on a hand including, but not limited to, a thumb, an index finger, middle finger, ring finger, or a pinky finger.

The term "print" can be any type of print including, but not limited to, a print of all or part of one or more fingers, palms, toes, foot, hand, etc. A print can also be a rolled print, a flat print, or a slap print.

The term "data" or "information" throughout the specification can be representative of a biometric, a digital or other image of a biometric (e.g., a bitmap or other file), extracted digital or other information relating to the biometric, etc.

The term "live scan" refers to a capture of any type of print image made by a print scanner. A live scan can include, but is not limited to, a scan of a finger, a finger roll, a flat finger, slap print of four fingers, thumb print, palm print, or a combination of fingers, such as, sets of fingers and/or thumbs from one or more hands or one or more palms disposed on a platen.

In a live scan, one or more fingers or palms from either a left hand or a right hand or both hands are placed on a platen of a scanner. Different types of print images are detected depending upon a particular application. For example, a flat print consists of a fingerprint image of a digit (finger or thumb) pressed flat against the platen. A roll print consists of an image of a digit (finger or thumb) made while the digit (finger or thumb) is rolled from one side of the digit to another side of the digit over the surface of the platen. A slap print consists of an image of four flat fingers pressed flat against the platen. A platen can be movable or stationary depending upon the particular type of scanner and the type of print being captured by the scanner.

The terms "biometric imaging system," "scanner," "live scanner," "live print scanner," "fingerprint scanner," and "print scanner" are used interchangeably, and refer to any type of scanner which can obtain an image of all or part of one or more fingers, palms, toes, foot, hand, etc. in a live scan. The obtained images can be combined in any format including, but not limited to, an FBI, state, or international ten-print format.

Overview

Embodiments of the present invention provide a fingerprint workstation system and method. Although ten-print capture and four finger slap capture are preferred systems and method described throughout the specification and/or claims, it is to be appreciated that any available number of fingers and/or thumbs are also contemplated within the scope of the present invention. Thus, even when the above terminology is used, it includes less fingers and/or thumbs.

The fingerprint workstation can provide a simple way to capture fingerprints to perform background checks by allowing four finger slap impressions to be captured in a single image. A simultaneous impression of the four fingers from one hand captured as a single image can automatically be segmented to create up to four separate images. After the fingerprints from the fingers from both hands are captured, thumb prints from both hands can be captured simultaneously. Each individual extracted image can then be placed within the corresponding finger and/or thumb print box on a fingerprint card. These processes, as further described with reference to FIGS. 6–8, can be performed using the systems shown in FIGS. 1–5 and 18.

Proper sequencing of the placement of the finger and/or thumb prints can be performed using software analysis and/or physical properties of a platen having a finger guide. As seen in FIGS. 14–17, discussed in detail below, each scanned image can have predetermined image sizes. For example, in an embodiment: (1) the image size for four finger slap images can be 1600 by 1000 pixels; (2) the image size for two fingers positioned on each side of physical barrier 302 (FIG. 3) can be 800 by 1000 pixels; (3) the image size for each finger can be 400 by 1000 pixels; and (4) the image size for each thumb can be 500 by 1000 pixels. Fingerprint images can be presented on a workstation screen, such as a monitor coupled to a personal computer, to provide real time quality checks and ease of correction. The fingerprint workstation uses slap impressions rather than conventional rolled impressions to speed up the process of applicant processing and simplify the task of capturing quality prints.

The fingerprint workstation can provide long sustained use at an affordable cost. The affordable cost can be achieved through many different factors. For example, one factor can be the mechanical simplicity and reduced complexity of the workstation. Hence, designing the fingerprint workstation to capture plain impression fingerprints provides a reduction in complexity relative to a rolled print design. Another factor can be the employment of an improved illumination system within the fingerprint workstation (e.g., an illumination system that provides excellent uniformity). The illumination system can also be thermally stabilized and generate little or no heat, thus creating a more efficient light source. Also, the illumination light wavelength can be selected to maximize fingerprint information and definition, thereby improving the quality of a fingerprint when dealing with any color pigmentation, overly wet, dry, or oily fingers, etc. to be fingerprinted.

Other factors that contribute to an affordable cost can include the ability to produce the workstation in high volume, a custom set of electronics and optics, the incorporation of a magnetic card scanner into the workstation for reduced enrollment times and less data errors, a replaceable silicone pad platen for reducing image rejections, a real-time quality control feedback system for reducing the time spent in fingerprint acquisition, and/or an ergonomic case and platen design for facilitating fingerprint capture and ease of use.

FIG. 1A is a high level block diagram illustrating a fingerprint workstation 100 according to one embodiment of the present invention. Fingerprint workstation 100 includes a ten-print scanner 102, a computer 104, and an interface cable 120. Interface cable 120 can be a 1394 serial interface bus that couples ten-print scanner 102 to computer 104. 1394 is an IEEE standard for a high performance serial bus designed to provide high speed data transfers. 1394 is a cost-effective way to share real-time information from data intensive applications, such as cameras, camcorders, VCRs, video disks, scanners, etc. The present invention is not limited to a 1394 interface. Any type of interface can be used to couple scanner 102 and computer 104.

Figure 1B:
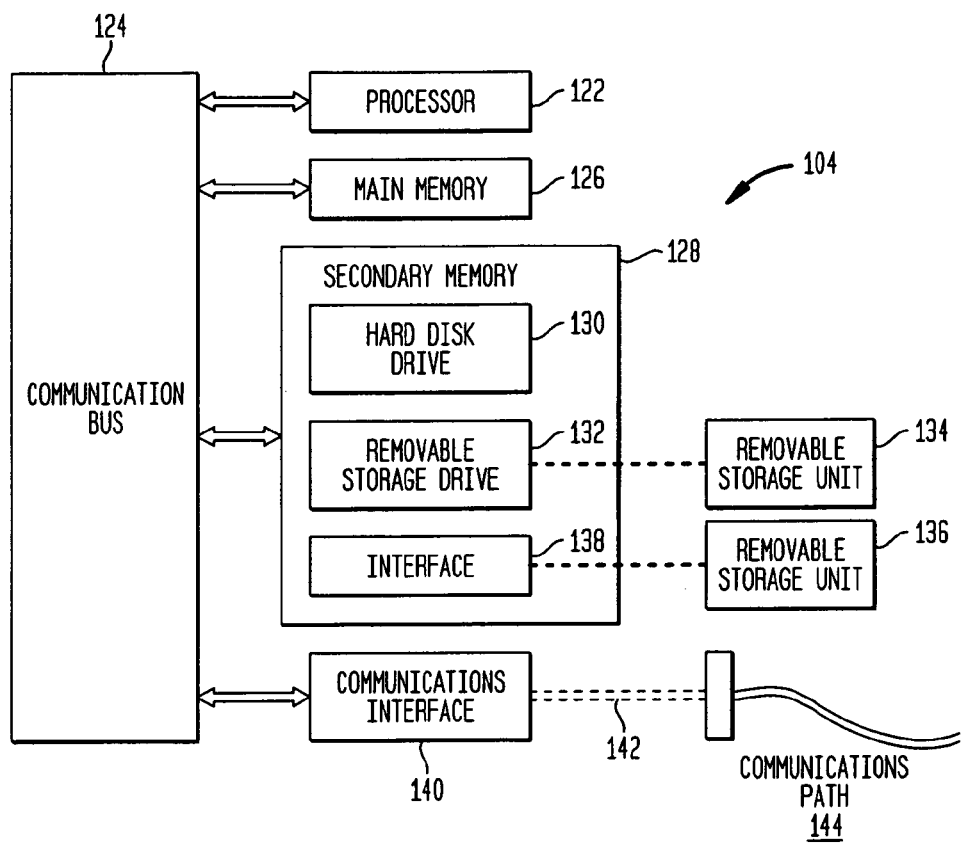
FIG. 1B shows an exemplary computer system.

Computer 104 may be any commercial off-the-shelf computer. For example, computer 104 may be a personal computer (PC). An example implementation of computer 104 is shown in FIG. 1B. Various embodiments are described in terms of this exemplary computer 104. After reading this description, it will be apparent to a person skilled in the relevant art how to implement the invention using other computer systems and/or computer architectures. Computer 104 may include one or more processors, such as processor 122. Processor 122 is connected to a communication bus 124.

Computer 104 also includes a main memory 126, preferably random access memory (RAM), and may also include a secondary memory 128. Secondary memory 128 may include, for example, a hard disk drive 130 and/or a removable storage drive 132, representing a floppy disk drive, a magnetic tape drive, an optical disk drive, etc. Removable storage drive 132 reads from and/or writes to a removable storage unit 134 in a well-known manner. Removable storage unit 134, represents a floppy disk, magnetic tape, optical disk, etc., which is read by and written to by removable storage drive 132. As will be appreciated, removable storage unit 134 includes a computer usable storage medium having stored therein computer software and/or data.

In alternative embodiments, secondary memory 128 may include other similar means for allowing computer programs or other instructions to be loaded into computer 104. Such means may include, for example, a removable storage unit 136 and an interface 138. Examples of such may include a program cartridge and cartridge interface (such as that found in video game devices), a removable memory chip (such as an EPROM, or PROM) and associated socket, and other removable storage units 136 and interfaces 138 which allow software and data to be transferred from the removable storage unit 136 to computer 104.

Computer 104 may also include a communications interface 140. Communications interface 140 allows software and data to be transferred between computer 104 and external devices. Examples of communications interface 140 may include a modem, a network interface (such as an Ethernet card), a communications port, a PCMCIA slot and card, a wireless LAN (local area network) interface, etc. Software and data transferred via communications interface 140 are in the form of signals 142 which may be electronic, electromagnetic, optical, or other signals capable of being received by communications interface 140. These signals 142 are provided to communications interface 140 via a communications path (i.e., channel) 144. This channel 144 carries signals 142 and may be implemented using wire or cable, fiber optics, a phone line, a cellular phone link, a wireless link, and other communications channels.

In this document, the term "computer program product" refers to removable storage units 134, 136, and signals 142. These computer program products are means for providing software to computer 104. The invention is directed to such computer program products.

Computer programs (also called computer control logic) are stored in main memory 126, and/or secondary memory 128 and/or in computer program products. Computer programs may also be received via communications interface 140. Such computer programs, when executed, enable computer 104 to perform the features of the present invention as discussed herein. In particular, the computer programs, when executed, enable processor 122 to perform the features of the present invention. Accordingly, such computer programs represent controllers of computer 104.

In an embodiment where the invention is implemented using software, the software may be stored in a computer program product and loaded into computer 104 using removable storage drive 132, hard disk drive 130 or communications interface 140. The control logic (software), when executed by processor 122, causes processor 122 to perform the functions of the invention as described herein.

In another embodiment, the invention is implemented primarily in hardware using, for example, hardware components such as application specific integrated circuits (ASICs). Implementation of hardware state machine(s) so as to perform the functions described herein will be apparent to persons skilled in the relevant art(s).

In yet another embodiment, the invention is implemented using a combination of both hardware and software.

In the embodiments using ten-print scanner 102, computer 104, and 1394 serial bus 120, the overall system costs less than a console configuration for an AFIS system, while providing high-speed data transfers. Current 1394 interfaces support serial transmission speeds up to 400 Mbps.

Returning to FIG. 1A, ten-print scanner 102 provides four finger slap impressions in a single image. Simultaneous impressions of up to four fingers from one hand are captured as a single image and automatically segmented to create up to four separate images. After the fingers from both hands are captured, thumb prints from one or both hands are captured simultaneously. Each individual extracted image can then be inserted within a corresponding print box on a fingerprint card. Proper sequencing of the placement of the prints can be performed using software analysis and/or physical properties of a platen having a finger guide. Fingerprint images are presented on a monitor associated with computer 104 for real time quality checks and ease of correction.

Ten-print scanner 102 comprises an electrical system 102A and an optical system 102B. The combination of electrical system 102A and optical system 102B provides electro-optical technology for capturing plain impression fingerprints. Electrical system 102A can provide power to ten-print scanner 102, control status signals for various components internal to ten-print scanner 102, control input/output signals between components internal to ten-print scanner 102, and control input/output signals between ten-print scanner 102 and computer 104 via IEEE 1394 interface cards 108 and 106, respectively. Optical system 102B can allow scanner 102 to illuminate an area of a platen for receiving a finger or fingers and capture information from the area of the platen, and convert the captured information into a fingerprint image. The captured information can be based on light reflected off the platen.

The Electrical System

Figure 1C:
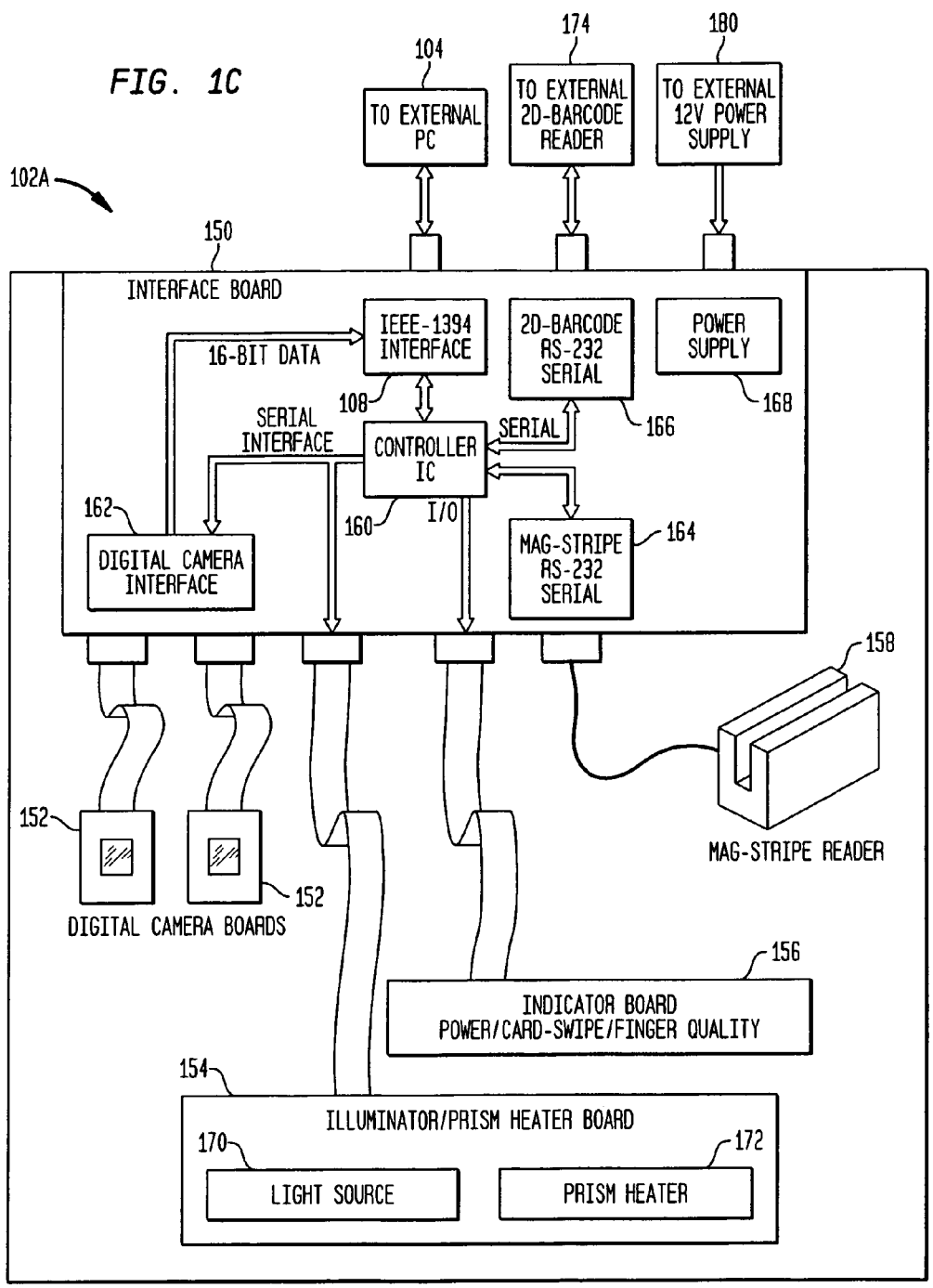
FIG. 1C shows an exemplary electrical system for a fingerprint workstation according to an embodiment of the present invention.

FIG. 1C shows electrical system 102A according to an embodiment of the present invention. Electrical system 102A can include an interface board 150, two sensors (e.g., digital camera boards) 152, an illuminator/prism heater board 154, an indicator board 156, and a magnetic-stripe reader 158. Interface board 150 can be coupled to digital camera boards 152, illuminator/prism heater board 154, indicator board 156, and magnetic-stripe reader 158. Interface board 150 also can interface each of boards 152, 154, and 156 and magnetic-stripe reader 158 to computer 104.

Interface board 150 can include a controller 160, a sensor (e.g., a digital camera) interface 162, a magnetic-stripe reader RS-232 serial interface 164, a 2D barcode RS-232 serial interface 166, IEEE-1394 interface 108, and a power supply interface 168. Controller 160 can be coupled to digital camera interface 162, illuminator/prism heater board 154, indicator board 156, magnetic-stripe reader RS-232 serial interface 164, 2D barcode RS-232 serial interface 166, and IEEE-1394 interface 108.

Controller 160 and IEEE-1394 interface 108 can provide a communication link between ten-print scanner 102 and computer 104. In some embodiments, controller 160 may be any one of a microprocessor, a microcomputer, a microcontroller, etc. In an embodiment, controller 160 may be used to control sensors (e.g., digital cameras) mounted on digital camera boards 152, a light source 170 used in optical system 102B, a prism heater 172 used to remove unwanted moisture from a platen, indicators used to indicate power status, card swipe status, and quality of fingerprint status, magnetic-stripe reader 158, and an external 2D barcode reader 174 that may be attached to scanner 102 via 2D barcode RS-232 serial interface 166. In another embodiment, both controller 160 and computer 104 are used to control the digital cameras, light source 170, prism heater 172, power/card swipe/fingerprint quality indicators, magnetic-stripe reader 158, and external 2D barcode reader 174. In yet another embodiment, computer 104 is used to control the digital cameras, light source 170, prism heater 172, power/card swipe/fingerprint quality indicators, magnetic-stripe reader 158, and external 2D barcode reader 174, and controller 160 is used as a conduit.

The 2D barcode reader 174 and magnetic-stripe reader 158 may be any off-the-shelf serial devices used to scan bar codes and data from documents, respectively. Bar codes and documents may include, but are not limited to, identification information, account information, fingerprint code information, etc. 2D barcode reader 174 is coupled to controller 160 via 2D barcode RS-232 serial interface 166. Magnetic-stripe reader 158 is coupled to controller 160 via magnetic-stripe RS-232 serial interface 164.

Using 2D barcode reader 174 and magnetic-stripe reader 158 can reduce enrollment time and can substantially reduce data errors. For example, 2D barcode 174 and/or magnetic-stripe reader 158 may be used in conjunction with a user interface to simplify demographic data entry. Demographic information swiped from magnetic-stripe reader 158 or 2D barcode reader 174 may be sent to controller 160 via interfaces 164 and 174, respectively, and controller 160 will transmit the information to computer 104 via IEEE-1394 interface 108.

Although not specifically shown in FIG. 1C, power supply interface 168 supplies power to all of the components within ten-print scanner 102 and can be coupled to an external 12-volt power supply 180.

Digital camera interface 162 can be coupled to controller 160 via a serial connection. Digital camera interface 162 can also be connected to digital camera boards 152 to provide electronics for clocking data to and from digital cameras mounted onto digital camera boards 152. Although two digital camera boards are shown, any number of digital camera boards and digital cameras may be used. Controller 160 may send control signals to each camera serially via digital camera interface 162. Digital camera interface 162 is also connected to IEEE-1394 interface 108 for sending 16-bit image data from the cameras mounted on digital camera boards 152 to computer 104.

Illuminator/prism heater board 154 can be coupled to controller 160 via a serial interface. Controller 160 can control different zones of light source 170 in the illumination system of optical system 102B. The light source can be an illumination source array. The illumination source array can be divided into zones. In one embodiment, a plurality of sources are divided into at least three groups in at least three respective zones. The intensity of each group of sources can be independently controlled by controller 160 relative to other groups such that a flat, uniform illumination is provided to the platen. Use of such zones simplifies control, while still retaining sufficient flexibility to adjust the relative intensity of the light source groups to ensure flat, uniform illumination is provided to the platen. An example of a more detailed description of an illumination source array and its division into zones can be found in U.S. patent application Ser. No. 10/050,046, filed on Jan. 17, 2002(now U.S. Pat. No. 6,954,260 that issued Oct. 11, 2005), entitled "Systems and Methods For Illuminating A Platen In A Print Scanner," to Arnold et al., which is incorporated herein by reference in its entirety.

Water vapor condensing onto a fingerprint platen surface of a prism may cause an undesirable fingerprint image called a halo. One way to prevent this from occurring, the fingerprint platen of scanner 102 can be heated to remove water vapor that condenses onto the platen surface of the prism or to prevent such water vapor from forming. An example system and method that can be used to heat the platen using heating elements attached to the sides of a prism is described in "Platen Heaters For Biometric Image Capturing Devices," U.S. patent application Ser. No. 10/047,983 (now U.S. Pat. No. 6,809,303 that issued Oct. 26. 2004), by Carver et al., filed on Jan. 17, 2002 and incorporated by reference herein in its entirety. In one embodiment, controller 160 can control trip point limits for turning heating elements ON and OFF when heating the fingerprint platen. Controller 160 can also monitor the temperature of the fingerprint platen via a thermostat controller. In one embodiment, this information may be transmitted to computer 104 via IEEE 1394 interface 108.

In some embodiments, ten-print scanner 102 can provide real-time feedback of fingerprint quality. This can be accomplished using fingerprint quality indicators (shown in FIG. 2), which provide feedback to the user to indicate whether an appropriate level of fingerprint quality has been achieved. Fingerprint quality indicators include four indicators, one for each finger of the four finger slap being scanned. Fingerprint quality indicators and the process used for determining the quality of each fingerprint is discussed in more detail below.

Indicator board 156 can be coupled to controller 160 via a serial input/output connection. Controller 160 can provide control signals to indicator board 156 for illuminating indicators, such as LEDs (light emitting diodes), to indicate whether the quality of a particular fingerprint for a particular finger is acceptable or unacceptable. Controller 160 can also provide a control signal for indicating that the system is powered-ON and control signals indicating whether a card swipe from magnetic-stripe reader 158 or 2D barcode reader 174 is successful. For example, if a card swipe is not successful, a CARD LED located on scanner 102 will be illuminated RED indicating that the card must be swiped again. Alternatively, if the card swipe is successful, the CARD LED will be illuminated GREEN.

The Optical System

Figure 2:
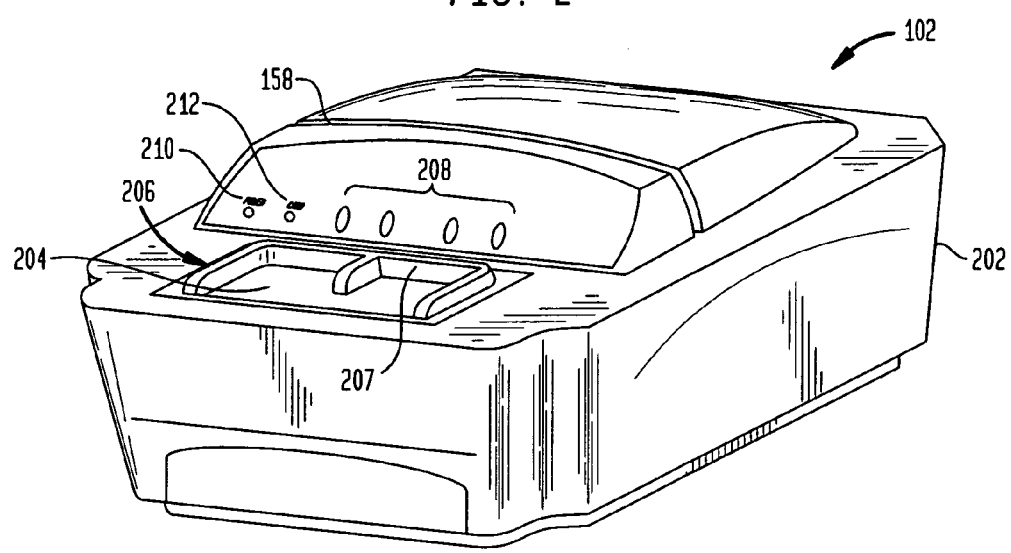
FIG. 2 shows a ten-print scanner according to an embodiment of the present invention.
Figure 3:
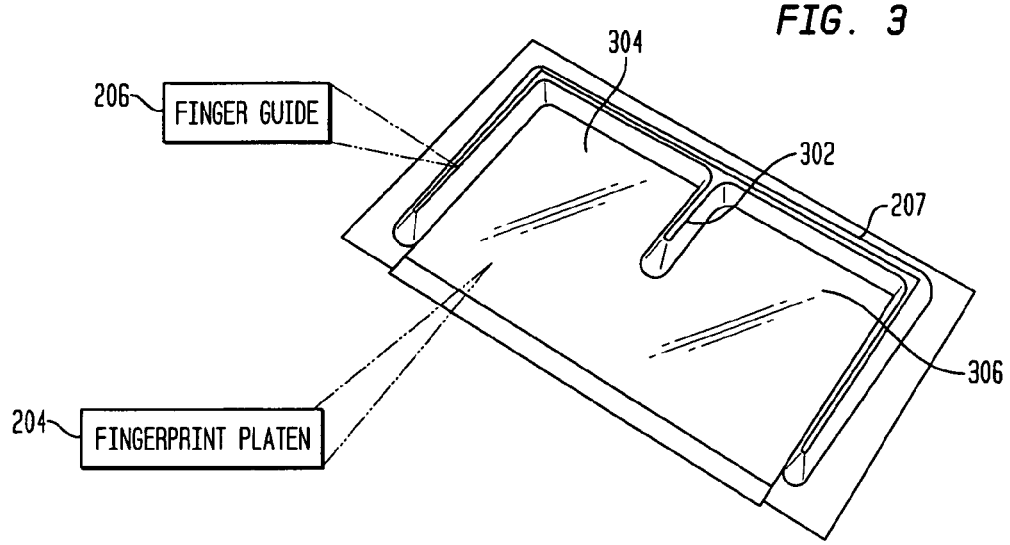
FIG. 3 shows a finger guide and a platen of a fingerprint workstation according to an embodiment of the present invention.
Figure 9:
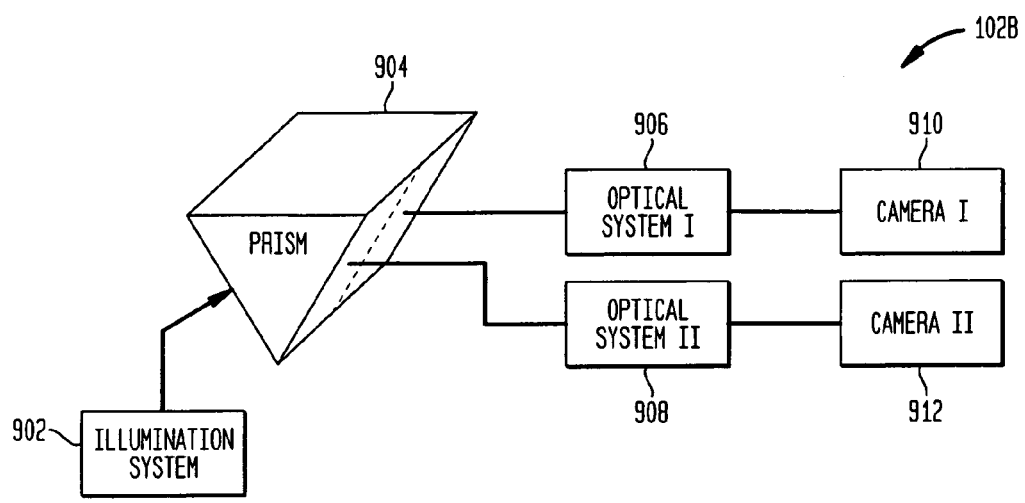
FIG. 9 shows an electrical/optical system of a ten-print scanner according to an embodiment of the present invention.

FIG. 9 is a block diagram illustrating scanner optical system 102B of ten-print scanner 102 according to an embodiment of the present invention. Scanner optical system 102B can include an illumination system 902, a prism 904, optical systems 906 and 908, and two cameras 910 and 912. Although two optical systems and digital cameras are shown, any number of optical systems and digital cameras may be used. As previously stated, one side of prism 904 is used as platen 204 and includes finger guide 206, as can be seen in FIG. 2. Illumination system 902 illuminates the underside of platen 204. As shown in FIG. 3, finger guide 206 is separated into left side 304 and right side 306. In one embodiment, camera 910, in combination with optical system 906, is used to detect an image of the fingers placed on the left side 304 of finger guide 206 and camera 912, in combination with optical system 908, is used to detect an image of the fingers placed on the right side 306 of finger guide 206. Digital cameras 910 and 912 can be any solid state digital camera, such as a CCD or CMOS camera. In one example, digital cameras 910 and 912 may be provided on digital camera boards 152 described in FIG. 1C.

Figure 11:
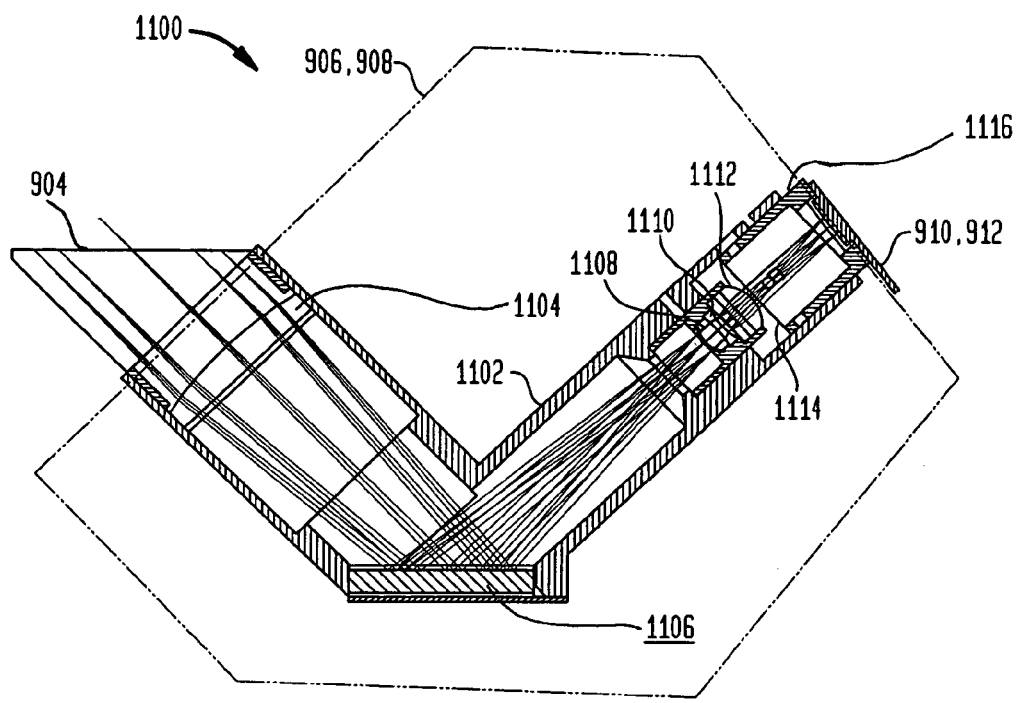
FIG. 11 shows a 90 degree cross section of an exemplary optical system according to an embodiment of the present invention.

FIG. 11 shows a 90 degree cross section of an exemplary optical system (e.g., optical system 906 or 908) according to an embodiment of the present invention. Optical system 1100 can include prism 904, an optical housing 1102, and camera 910 or 912. Optical housing 1102 can be coupled to prism 904 at one end and to camera 910 or 912 using a focus mount 1116 at the opposite end. Optical housing 1102 can include, inter alia, a first lens element 1104, a fold mirror 1106, a second lens element 1108, a third lens element 1110, a fourth lens element 1112, and an aperture stop 1114.

A biometric object, such as a finger or fingers, placed on prism 904 for imaging, is focused through first lens element 1104 and reflected off of fold mirror 1106. Aperture stop 1114 is used to limit light passing through optical system 906 or 908 such that only light rays traveling within a range of angles at or near a direction along an optical axis are detected. Aperture stop 1114 helps maintain telecentricity in optical system 1100. The reflected image is then focused through second, third, and fourth lens elements 1108, 1110, and 1112 for detection by camera 910 or 912.

In an embodiment, first lens element 1104 has two convex surfaces and is made of SF3 glass. Second lens element 1108 has two convex surfaces and is made of LaK10 glass. Third lens element 1110 has two concave surfaces and is made of SF8 glass. Fourth lens element 1112 has a concave surface and a convex surface and is made of SK16 glass. Although lens elements 1104, 1108, 1110, and 1112 are discussed as being made of glass, they are not limited to glass. In fact, lens 1104, 1108, 1110, and 1112 can be made of any transparent material that can focus light rays and form images by refraction, such as plastic, or the like.

Figure 12:
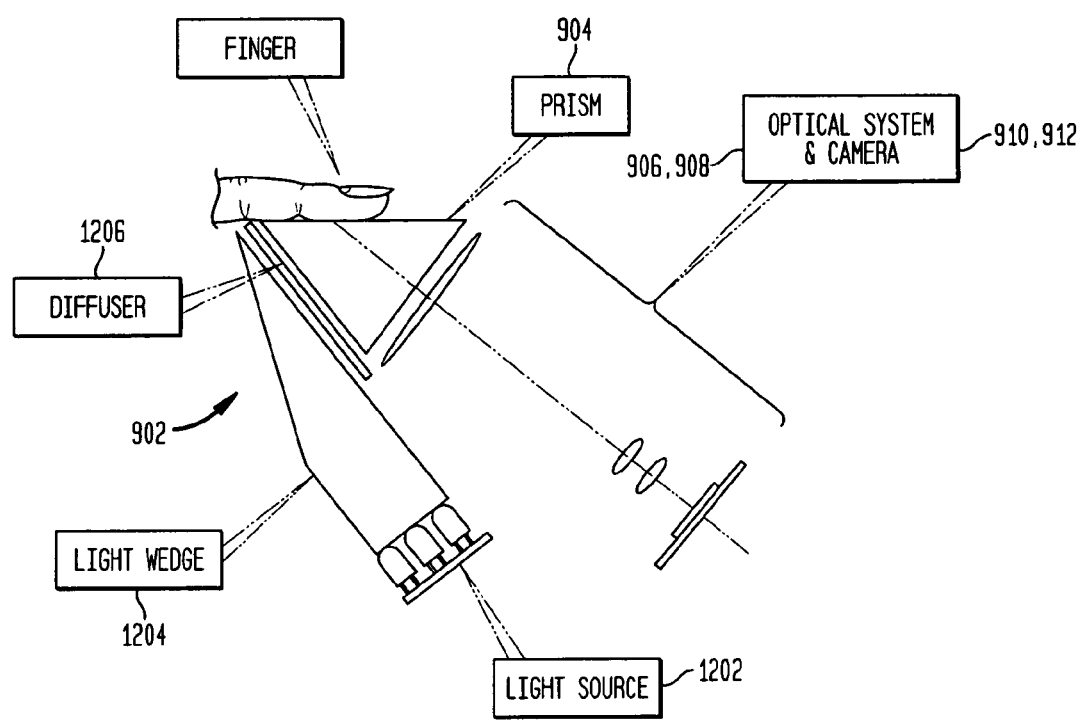
FIG. 12 shows an exemplary illumination system according to an embodiment of the present invention.

FIG. 12 shows an exemplary illumination system (e.g., illumination system 902) according to an embodiment of the present invention. In one embodiment, illumination system 902 includes an illumination source array 1202, a light wedge 1204, and a diffuser 1206. Illumination source array 1202 illuminates an end region of light wedge 1204. Light wedge 1204 then internally reflects light and sends it to diffuser 1206 prior to entering prism 904. The light from illumination source array 1202 can be any single wavelength or narrowband of wavelengths such as infra-red, visible or ultraviolet light. In one example, blue/green light having a wavelength of approximately 510 nm is used. An example illumination system is described in "Systems and Methods For Illuminating A Platen In A Print Scanner," U.S. patent application Ser. No. 10/050,046, by Arnold et al., filed on Jan. 17, 2002(now U.S. Pat. No. 6,954,260 that issued Oct. 11. 2005), which is incorporated herein by reference in its entirety. In some embodiments, the light wedge 1204 can be used to aid in capturing print information for individuals with smaller hands and/or smaller fingers. It is to be appreciated that although a diffuser 1206 is shown and described, in various embodiments wedge 1204 can cause diffusing of the light without requiring diffuser 1206.

Finger Guide and Platen

FIG. 2 shows a ten-print scanner 102 according to an embodiment of the present invention. A housing 202 for ten-print scanner 102 can be constructed of impact resistant injection molded polycarbonate. One skilled in the relevant art(s) would know that other types of housings could be used without departing from the scope of the invention. Ten-print scanner 102 can include a fingerprint platen 204, a finger guide 206, fingerprint quality indicators 208, a power indicator 210, and a card indicator 212. Ten-print scanner 102 can also include magnetic-stripe reader 158 located at the top of ten-print scanner 102. Fingerprint quality indicators 208 are located directly above finger guide 206. Power indicator 210 is illuminated when power is applied to scanner 102, for example via external 12-volt power supply 180. Card indicator 212 can be illuminated green when a card swipe is successful and red when a card swipe is unsuccessful.

Fingerprint platen 204 receives the four finger slaps and the thumbs during fingerprinting. In an embodiment, platen 204 is a surface on one side of a prism (not shown). In another embodiment, platen 204 is a surface of an optical quality silicone rubber sheet placed on top of one side of a prism. The optical quality silicone rubber sheet can be replaceable. Optical quality silicone rubber platens provide adequate surface quality to optimize image enhancements as well as protect the optical surface. Example optical quality silicone rubber platens are described in U.S. patent application Ser. No. 10/132,719, entitled "Silicone Rubber Surfaces for Biometric Print TIR Prisms," filed Apr. 26, 2002, and incorporated by reference herein in its entirety.

Finger guide 206 can be located along the sides and the top of fingerprint platen 204. Finger guide 206 is a mechanism for locating and separating the four finger slap to provide accurate and efficient placement of fingers. Finger guide 206 also provides a physical barrier that facilitates the identification of either a right or left hand using software analysis of the four finger slap fingerprint images.

FIG. 3 shows finger guide 206 and fingerprint platen 204 of fingerprint workstation 100 according to an embodiment of the present invention. As previously stated, one side of a prism is used as fingerprint platen 204. Fingerprint platen 204 can include an optical quality silicone rubber sheet attached to the side of the prism used as the platen. The optical silicone pad may be easily removed and replaced by operating personnel when needed. The size of the active fingerprint platen area 204 can be about 2.05 by about 3.6 inches at 500 dots per inch ("dpi").

Finger guide 206 includes a physical barrier 302 positioned along the middle of the top of finger guide 206. Physical barrier 302 is used to separate the four finger slap. Two fingers of the four finger slap are placed on a left side 304 of physical barrier 302 while the other two fingers of the four finger slap are placed on a right side 306 of physical barrier 302.

Figure 4A:
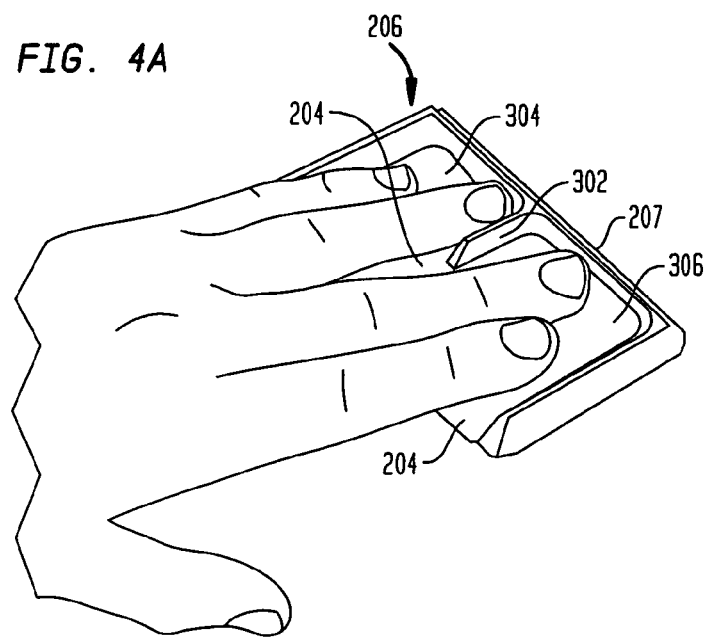
FIG. 4A shows left-hand positioning on a finger guide of a fingerprint workstation according to an embodiment of the present invention.
Figure 4B:
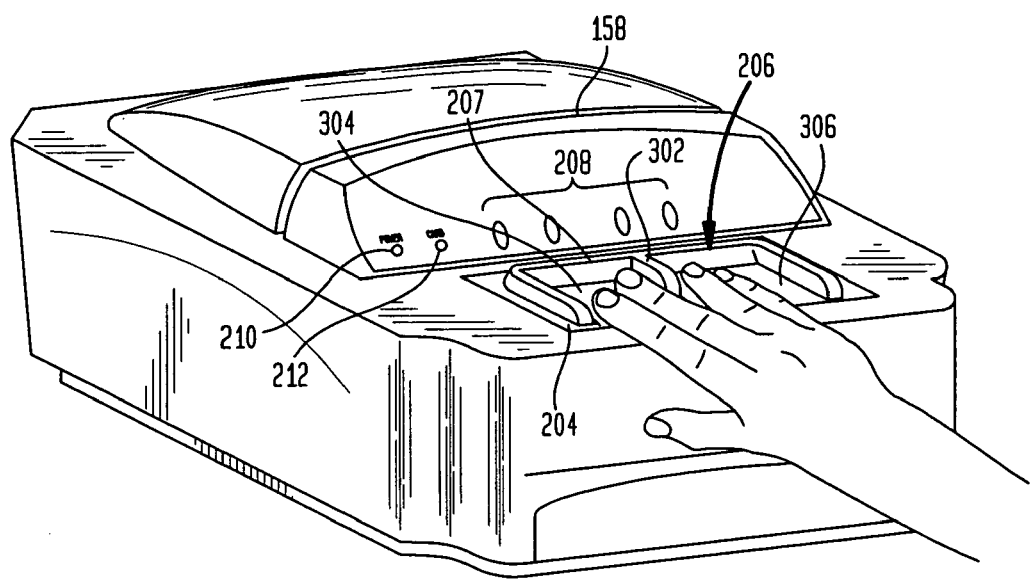
FIG. 4B shows right-hand positioning on a finger guide of a fingerprint workstation according to an embodiment of the present invention.

FIG. 4A shows placement of up to four fingers on a left hand on fingerprint platen 204 and finger guide 206 according to an embodiment of the present invention. As is shown in FIG. 4A, when the left hand is placed on platen 204, finger guide 206 physically separates a ring finger and a middle finger of the left hand. Finger guide 206 is designed so that when the tips of the middle and ring fingers make contact with finger guide 206, the four fingers are positioned correctly in the viewing area. This forces the four fingers to have a diagonal orientation with respect to section 207 of finger guide 206. This is also true when a right hand is positioned on fingerprint platen 204, as shown in FIG. 4B. Based on the orientation of the four fingers on the viewing area and the separation of the ring and middle fingers on finger guide 206, a determination can be made as to whether the left or right hand is placed on fingerprint platen 204. The process for determining whether a left or right hand is being imaged is described below with reference to FIGS. 6, 7, and 8.

Figure 4C:
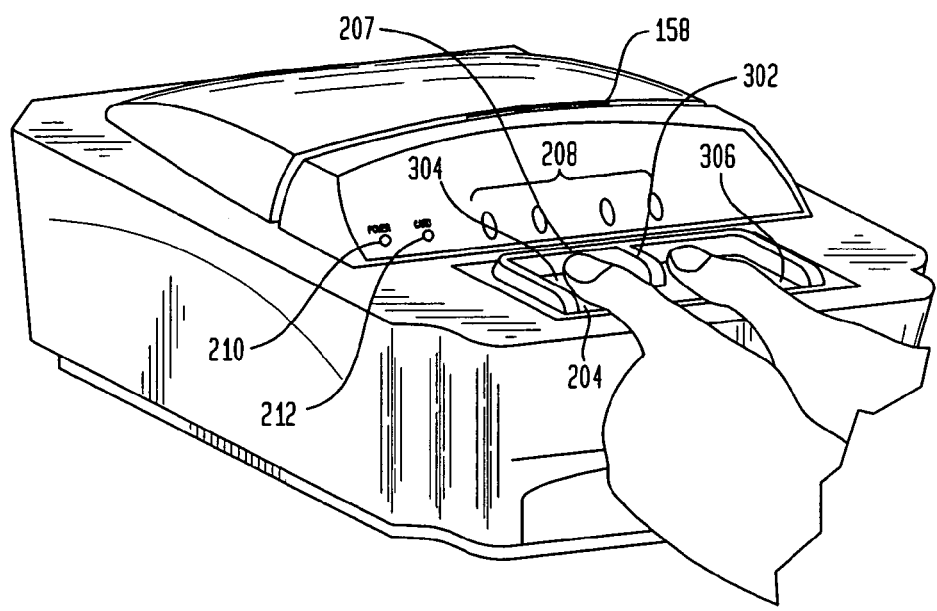
FIG. 4C shows thumb positioning of a finger guide of a fingerprint workstation according to an embodiment of the present invention.

FIG. 4C shows placement of thumbs onto fingerprint platen 204 according to an embodiment of the present invention. When thumb prints are captured, the left thumb is placed on left side 304 of finger guide 206 and the right thumb is placed on right side 306 of finger guide 206.

Real-time Feedback Quality Indicators

The present invention can provide feedback of real-time individual fingerprint quality to an operator and/or a user. Providing real-time fingerprint quality feedback simplifies the use of fingerprint workstation 100 and facilitates capturing of the best possible fingerprints. In general, feedback can indicate to an operator and/or a user an acceptable scan condition of each individual finger scanned. An acceptable scan condition can include, among others, an indication of acceptable finger placement relative to the platen, and/or an indication that an acceptable image of a print of the finger was captured.

Figure 5:
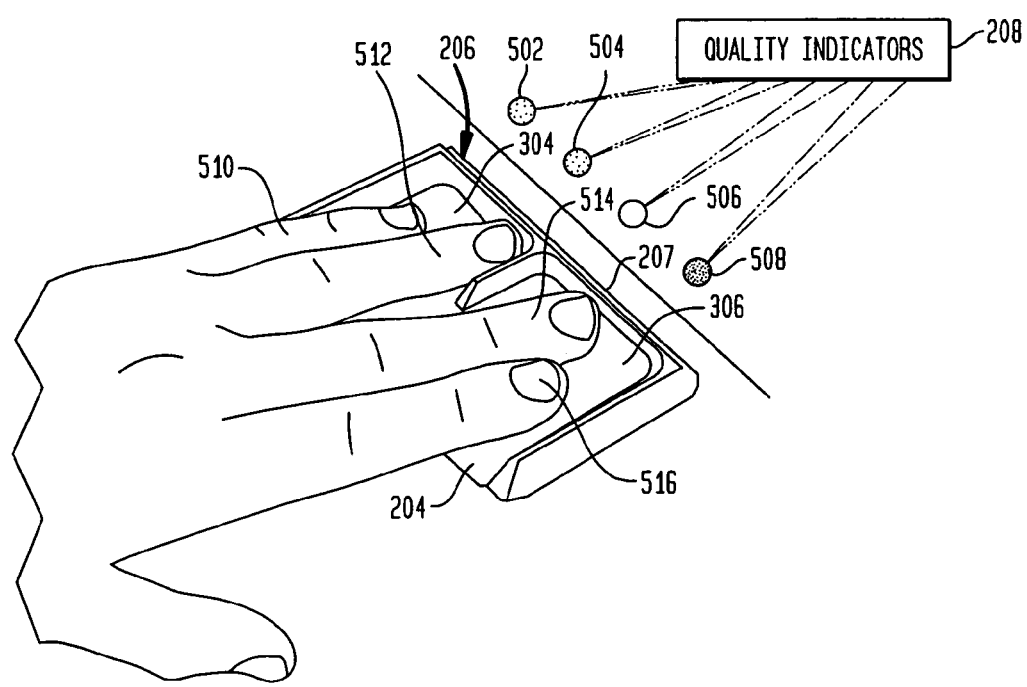
FIG. 5 shows feedback indicators for a fingerprint workstation according to an embodiment of the present invention.

FIG. 5 shows feedback indicators 208 for fingerprint workstation 100 according to an embodiment of the present invention. An indicator (502, 504, 506, and 508) is assigned to each finger of the four finger slap being scanned. For example, if a left hand is placed on fingerprint platen 204, indicator 502 corresponds to pinky finger 510, indicator 504 corresponds to ring finger 512, indicator 506 corresponds to middle finger 514, and indicator 508 corresponds to pointer finger 516. If a right hand is placed on fingerprint platen 204, indicator 502 corresponds to pointer finger 516, indicator 504 corresponds to middle finger 514, indicator 506 corresponds to ring finger 512, and indicator 508 corresponds to pinky finger 510.

Each image frame can be processed to determine a quality of the individual fingerprint. After determining the quality of each individual fingerprint, the corresponding indicators 502, 504, 506, and 508 provide feedback to the user to indicate possible corrections or the need to re-position fingers 510, 512, 516, and/or 518 on fingerprint platen 204. This assures that an appropriate level of fingerprint quality can be achieved. In an embodiment, multi-color LEDs can be used for indicators 502, 504, 506, and 508. In that embodiment, a red LED may indicate poor quality, a green LED may indicate acceptable quality, and an amber LED may indicate possibly acceptable quality. In another embodiment, indicators 502, 504, 506, and 508 may be bar graph LED indicators, wherein the level of the bar indicates quality acceptance. In still further embodiments, indicators 502, 504, 506, and 508 can be any electrical, mechanical, or audio device or signal know to alert a user of a condition, as would be known to one skilled in the art.

Figure 13:
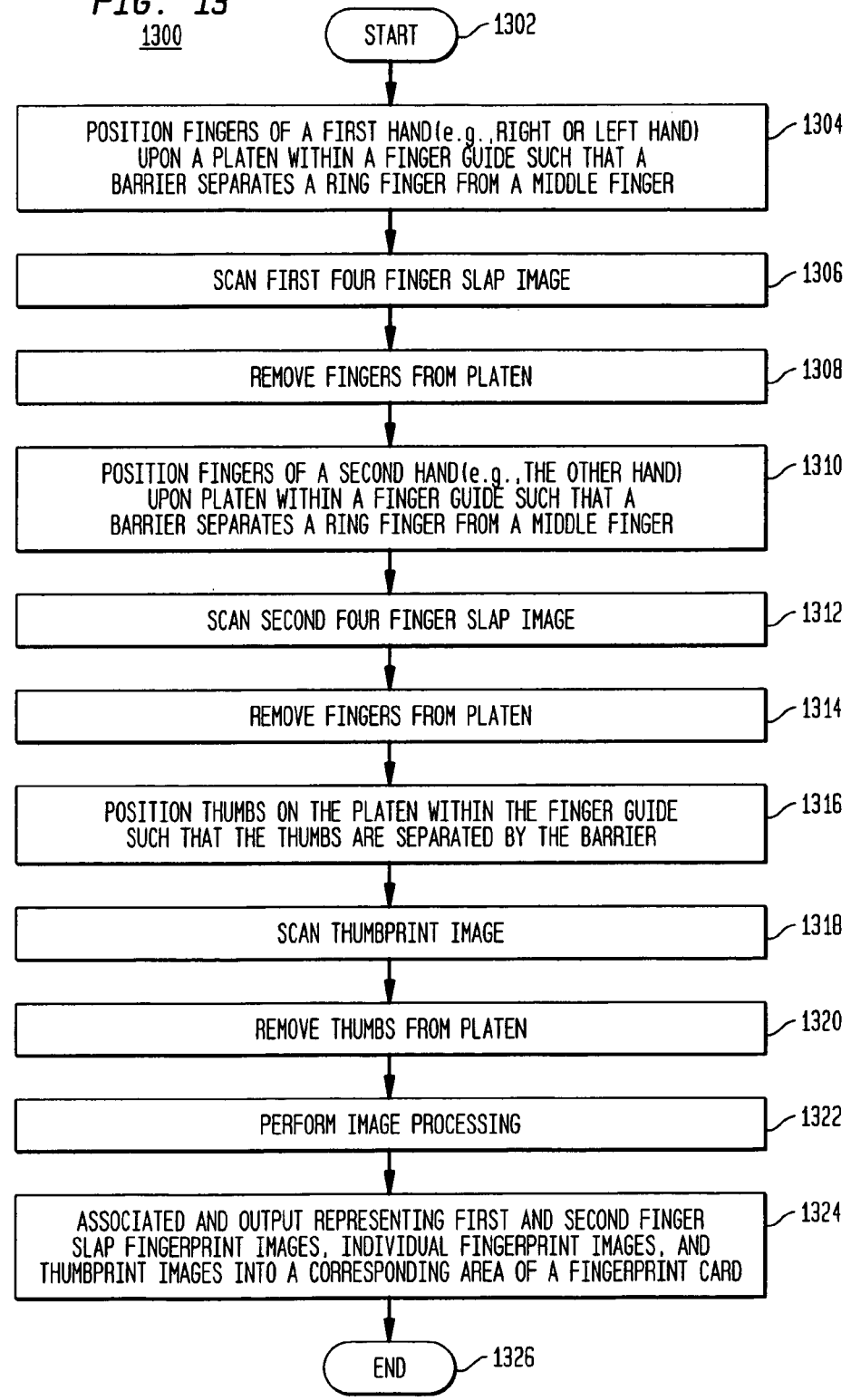
FIG. 13 is a flow diagram depicting a method of capturing and processing print images according to embodiments of the present invention.

Quality indications can also be displayed at a separate display on the fingerprint workstation. For example, an external PC 104 can output a variety of displays indicating quality of fingerprint scan for each finger Overall Method of Capturing and Processing Prints FIG. 13 is a flowchart depicting a method 1300 for capturing and processing prints according to embodiments of the present invention (steps 1302–1328). After starting in step 1302, in step 1304 fingers of a first hand (e.g., one of the right or left hand) are positioned upon a platen within a finger guide. This can be so that a barrier separates a ring finger from a middle finger. In step 1306, a four finger slap image of the first hand is scanned. In step 1308, fingers from the first hand are removed from the platen.

In step 1310, finger from a second hand (e.g., the other hand) are positioned upon the platen within the finger guide. This can be so that the barrier separates a ring finger from a middle finger. In step 1312, a four finger slap image of the second hand is scanned. In step 1314, fingers from the second hand are removed from the platen.

In step 1316, each thumb is positioned on the platen within the finger guide. The can be so that the barrier separates the thumbs. In step 1318, thumb images are scanned. In step 1320, the thumbs are removed from the platen.

In an embodiment, in step 1322 various types of image processing method can take place. Several types of image processing that can take place are described in relation to FIGS. 6–8 described in detail below.

In an embodiment, in step 1324 an output representing first and second four finger slap images, individual fingerprint images, and/or thumb images can be associated (e.g., printed) onto corresponding areas of a fingerprint card.

In step 1326, process 1300 ends.

Method for Determining Quality of Captured Fingerprints

Figure 6:
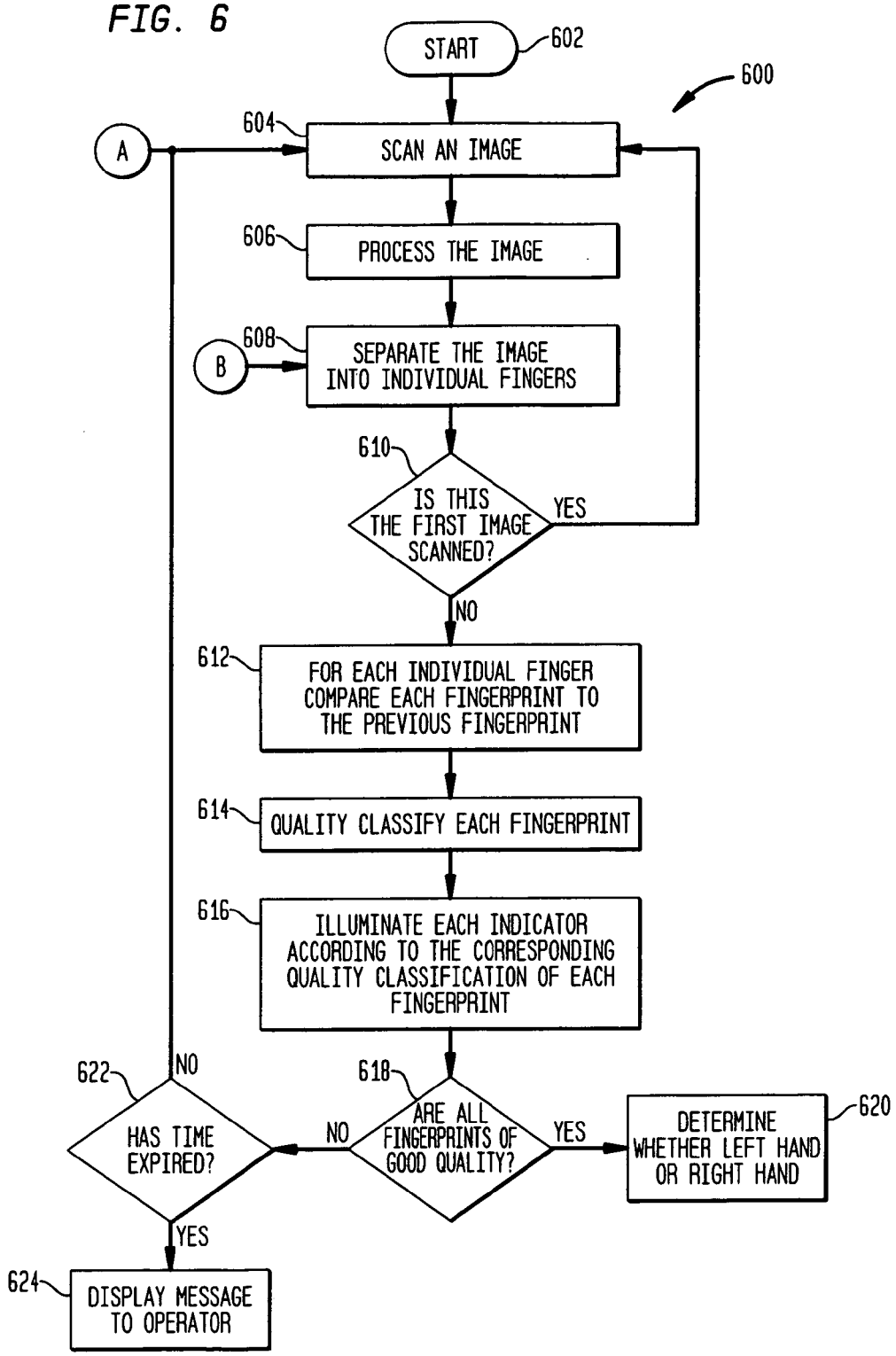
FIG. 6 is a flow diagram depicting a method that determines a quality of individual fingerprints according to an embodiment of the present invention.

FIG. 6 is a flow diagram 600 depicting a method for determining the quality of individual fingerprints according to an embodiment of the present invention (steps 602–624). The invention is not limited to the description provided herein with respect to flow diagram 600. Rather, it will be apparent to persons skilled in the relevant art(s) after reading the teachings provided herein that other functional flow diagrams are within the scope of the present invention. The process begins with step 602 and immediately proceeds to step 604.

In step 604, a four finger slap image is scanned. In an embodiment of the present invention, a signal may be sent to indicators 502, 504, 506, and/or 508 (see FIG. 5) to indicate whether or not fingerprints are being scanned. For example, if indicators 502, 504, 506, and 508 are green, then fingerprints are being scanned. If indicators 502, 504, 506, and 508 are red, then fingerprints are not being scanned. In step 606, the scanned image is processed. The procedure for processing the scanned image according to an embodiment of the present invention is further described with respect to FIG. 7. In step 608, each finger of the four finger slap image is separated into its own image. In decision step 610, it is determined whether the processed image is the first image scanned. If yes, the process proceeds back to step 604 to scan another image. If no, the process proceeds to step 612.

In step 612, each individual fingerprint is compared to a corresponding previously scanned fingerprint. In step 614, in one embodiment each fingerprint is quality classified as being either acceptable, possibly acceptable, or unacceptable according to the results of the comparison. In an alternative embodiment, in step 614 each fingerprint is quality classified as being either acceptable or unacceptable. In various embodiments, quality classification can be based on if an area and shape of currently imaged fingerprints are: of equal size and shape, within a previously determined threshold associated with an acceptable quality fingerprint, etc. In these cases, an indicator light can be illuminated green to indicate the currently scanned fingerprint image is an acceptable quality image. If the size and the shape of the currently imaged scanned fingerprint image are below the predetermined acceptable quality threshold, but above a previously determined threshold associated with a unacceptable quality fingerprint, then the indicator light can be illuminated amber to indicate the currently scanned fingerprint image is an possibly acceptable quality image. Finally, if the size and shape of the currently imaged fingerprint is at or below the previously determined threshold associated with an unacceptable quality, then the indicator light can be illuminated red to indicate that the currently scanned fingerprint image is an unacceptable quality image.

It is to be appreciated that all threshold levels are changeable and may be based on customer requirements. For example, one customer's requirements may be to set the acceptable quality threshold at 90% and the unacceptable quality threshold at 10%. Another customer's requirements may not be as stringent, only requiring the acceptable quality threshold to be at 80% and the unacceptable quality threshold to be at 20%.

In step 616, each indicator is illuminated according to the quality classification of the fingerprint. In decision step 618, it is determined whether all fingerprints for the four finger slap are of acceptable quality. If yes, the process proceeds to step 620, where a determination is made as to whether a left or right hand is being imaged. This process is described with reference to FIG. 8. If no, the process then returns to step 604 to scan another image.

This above process is repeated until either fingerprints of acceptable quality for all fingers are achieved or a time-out has occurred. In step 622, a determination is made whether a time-out has occurred. If a time-out occurs, in step 624 a message is displayed to the operator indicating that the operator may switch from an automatic detection mode to a manual mode for the image capture operation and repeat the process manually, if necessary. Alternatively, the operator may use a modified version of the program for special circumstances (e.g., a person having less than four fingers or having less than two thumbs). If no time out has occurred, process 600 returns to step 604.

Figure 10:
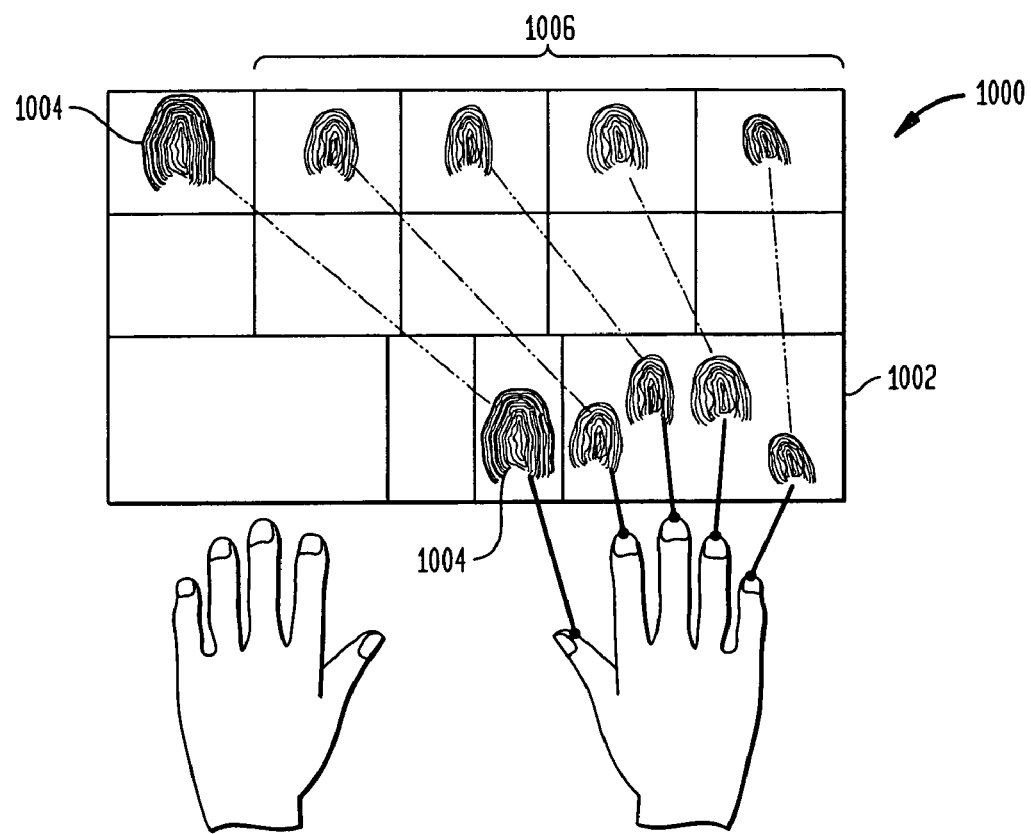
FIG. 10 shows a placement of fingerprints onto a fingerprint card.

FIG. 10 shows a fingerprint receiving device (e.g., a fingerprint card) 1000 for a right hand according to embodiments of the present invention. In this embodiment, once Acceptable quality scanned fingerprint images are achieved for two four finger slaps and two thumbs, four finger slap prints 1002, thumb prints 1004, and segmented fingerprints 1006 are output to fingerprint card 1000.

Slap Image Processing

Figure 7:
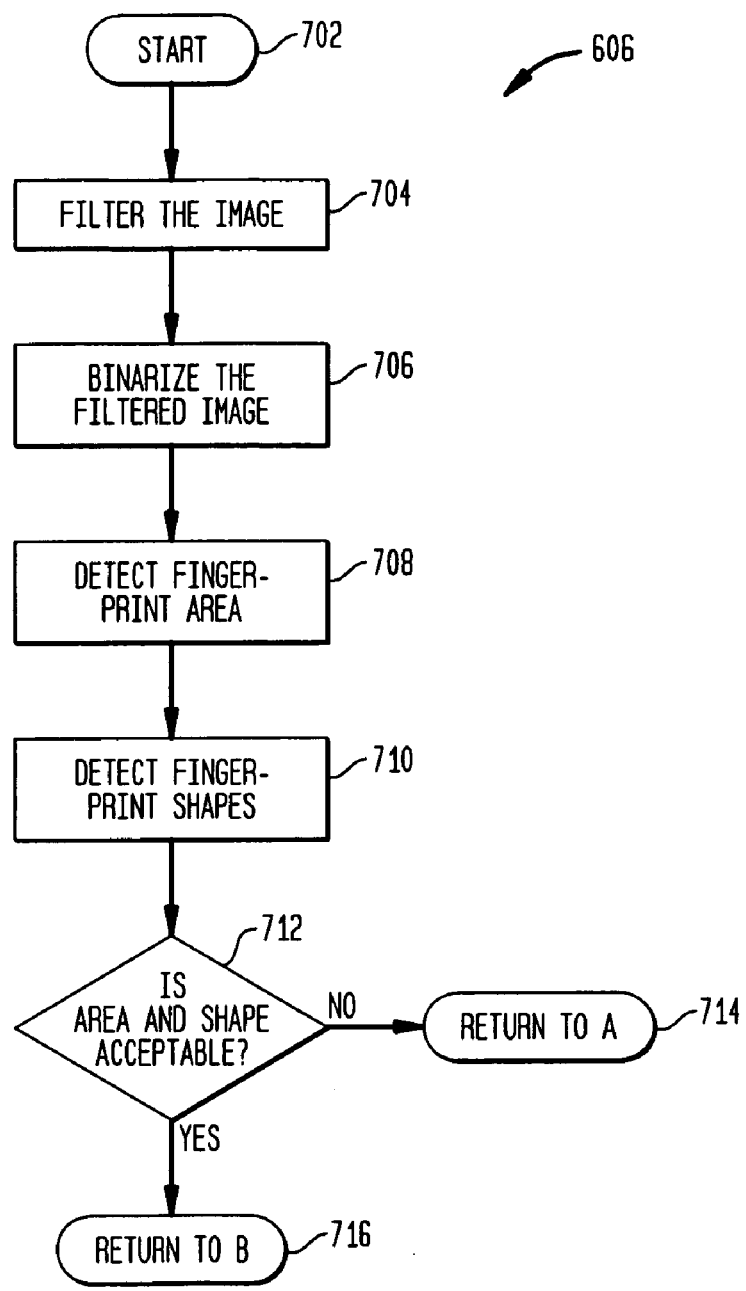
FIG. 7 is a flow diagram depicting a method for processing four finger slap images according to an embodiment of the present invention.

FIG. 7 is a flow diagram illustrating method 606 for processing the four finger slap image according to an embodiment of the present invention (steps 702–716). The invention is not limited to the description provided herein with respect to flow diagram 606. Rather, it will be apparent to persons skilled in the relevant art(s) after reading the teachings provided herein that other functional flow diagrams are within the scope of the present invention. The process begins with step 702, and immediately proceeds to step 704.

In step 704, the scanned fingerprint image is filtered to remove all high frequency content, which corresponds to ridge and valley transitions of a finger. Thus, the scanned fingerprint image is filtered to remove all of the ridge and valley transitions to indicate the outlying of the fingerprint area.

In step 706, a binarization process is performed. The binarization process can remove all of the gray areas and replace them with either black or white pixels based on a black and white threshold point. In one embodiment, the binarization process begins by taking an average gray scale value of the filtered image. In this instance, the average gray scale value is the black and white threshold point. In this embodiment, all of the pixel values above the average value are replaced with white pixels and all the pixel values equal to and below the average value are replaced with black pixels. The resulting image is comprised of all black and white pixels.

In step 708, a fingerprint area is detected. Usually, the black areas of the image are concentrated around the fingerprints. Thus, the detection step detects the areas concentrated by black pixels. In step 710, fingerprint shapes are detected. The fingerprint shapes can be oval-like shapes. The fingerprint shape detection step detects the areas concentrated by black pixels that are comprised of oval-like shapes. In step 712, it is determined whether the detected areas and shapes are representative of a four finger slap and acceptable. This can be based on historical data of a four finger slap image. For example, a previously determined Acceptable quality four finger slap image can be stored and used in comparison to the presently detected image to determine if the presently detected areas and shapes are representative and/or acceptable. If no, then the process returns to step 604 in FIG. 6 to scan another image. If yes, then the process proceeds to step 608 in FIG. 6 to separate the image into individual fingers.

Left Hand/Right Hand Determination

Figure 8:
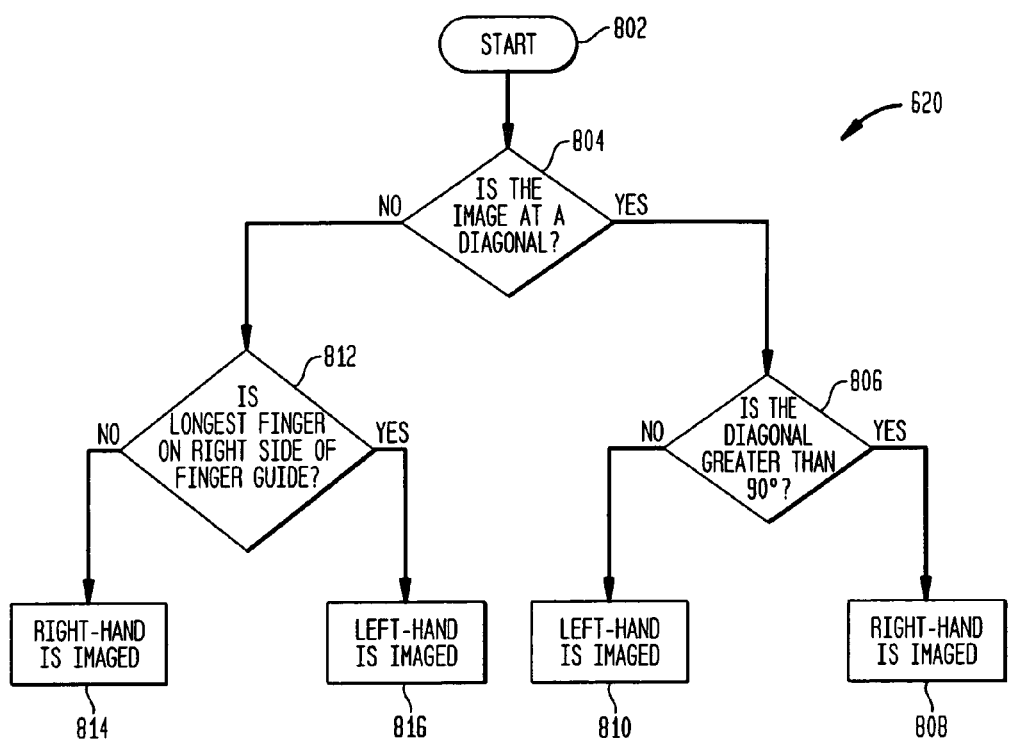
FIG. 8 is a flow diagram depicting a method for determining whether a scanned four finger slap is a right hand or a left hand according to an embodiment of the present invention.

FIG. 8 is a flow diagram 620 depicting a method for determining whether a scanned four finger slap image is of a right hand or a left hand according to an embodiment of the present invention (steps 802–816). The invention is not limited to the description provided herein with respect to flow diagram 620. Rather, it will be apparent to persons skilled in the relevant art(s) after reading the teachings provided herein that other functional flow diagrams are within the scope of the present invention. The process begins with step 802, and immediately proceeds to step 804.

As previously stated, the orientation of the up to four fingers on the viewing area or fingerprint platen 204 and the separation of the ring and middle fingers by physical barrier 302 of finger guide 206 are used to determine whether the left or right hand is placed onto fingerprint platen 204 for imaging. For optimal performance, a person must place their fingers onto fingerprint platen 204 in a manner such that the largest area possible of the fingerprint image is obtained, while also capturing all four fingers. In order for this to occur, the person must place the four finger slap at a diagonal with the tips of the middle finger and the ring finger making contact with finger guide 206. Other positions may also be possible.

In decision step 804, it is determined whether the detected fingerprints are at a diagonal. If yes, in step 806 it is then determined whether the diagonal is less than 90 degrees or greater than 90 degrees with respect to the base of fingerprint platen 204. If the diagonal is more than 90 degrees, in step 808 it is determined that the right hand is being imaged. If the diagonal is less than 90 degrees, in step 810 it is determined that the left hand is being imaged.

It is to be appreciated that although the person positioning fingers at a diagonal may be an optimal position, the invention is not limited to diagonal positioning of the four finger slap. Other positions may be possible.

Returning to decision step 804, if it is determined that the fingerprints are not at a diagonal, then the process proceeds to decision step 812. In decision step 812, it is determined whether the longest finger (i.e., the middle finger) is on right side 306 of physical barrier 302. If the longest finger is not on right side 306 of physical barrier 302, then in step 814 it is determined that the right-hand is being imaged. If the longest finger is on right side 306 of physical barrier 302, then in step 816 it is determined that the left-hand is being imaged.

In an alternative embodiment, decision step 812 may be altered to determine whether the pinky finger (i.e., the smallest finger) is on right side 306 of physical barrier 302. If the pinky finger is on right side 306 of physical barrier 302, then the right-hand is being imaged. If the pinky finger is not on right side 306 of physical barrier 302, then the left-hand is being imaged. In another alternative embodiment, decision step 812 may search left side 304 of physical barrier 302 to determine whether the longest finger or the shortest finger can be found.

Print Images

Figure 14:
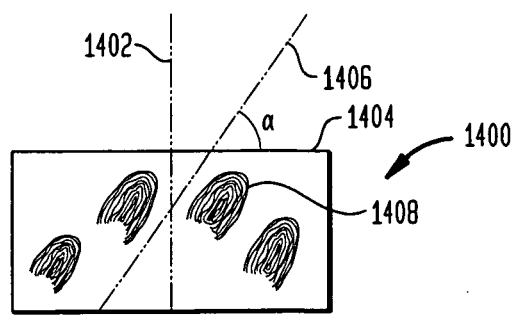
FIG. 14 shows a four finger slap image according to embodiments of the present invention.
Figure 15:
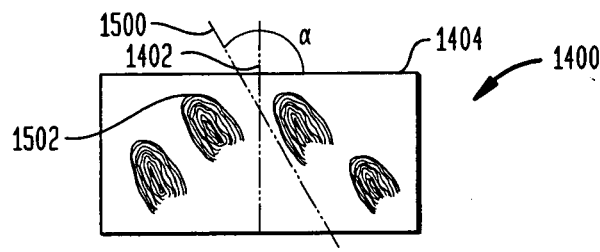
FIG. 15 shows a four finger slap image according to embodiments of the present invention.
Figure 16:
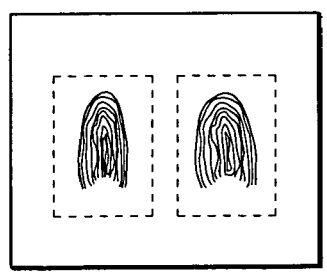
FIG. 16 shows a section of the four finger slap image in FIG. 14.
Figure 17:
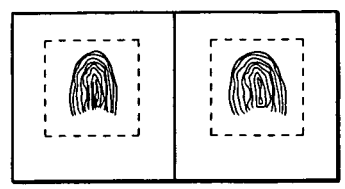
FIG. 17 show images of thumbs according to embodiments of the present invention.

FIGS. 14–15 are images (e.g., a four finger slap image) 1400 according to embodiments of the present invention. FIG. 14 shows a left hand image 1400, while FIG. 15 shows a right hand image 1400. Image 1400 can be 1600 pixels by 1000 pixels. In this embodiment, as seen in FIG. 16, an image of two fingers on either side of barrier 302 can be 800 pixels by 1000 pixels and an image of each individual finger (not shown) can be 400 pixels by 1000 pixels. Also, in this embodiment, images of thumbs, as seen in FIG. 17, can be 500 pixels by 1000 pixels.

In the FIG. 8 described above, a method 620 for determining which hand is being scanned is discussed. FIGS. 14–15 show how the image analysis works. In one embodiment, an angle of a diagonal line is used to determine which hand is being scanned. In this embodiment, an angle of a diagonal line is with respect to a Y axis 1402 and an X axis 1404. If the diagonal line is an axis of symmetry of a left hand 1406, the diagonal line is at an angle $\alpha$ less than 90°.

In contrast, if the diagonal line is an axis of symmetry of a right hand 1500, the diagonal line is at an angle α greater than 90° degrees.

In another embodiment, a highest fingerprint image is used to determine which hand is being scanned. For example, in FIG. 14 a highest fingerprint image 1408 is on a right side of an image of barrier 302. This means that a left hand was scanned. In contrast, in FIG. 15 a highest fingerprint image 1502 is on a left side of the image of barrier 302. This means that a right hand was scanned.

Overall System

Figure 18:
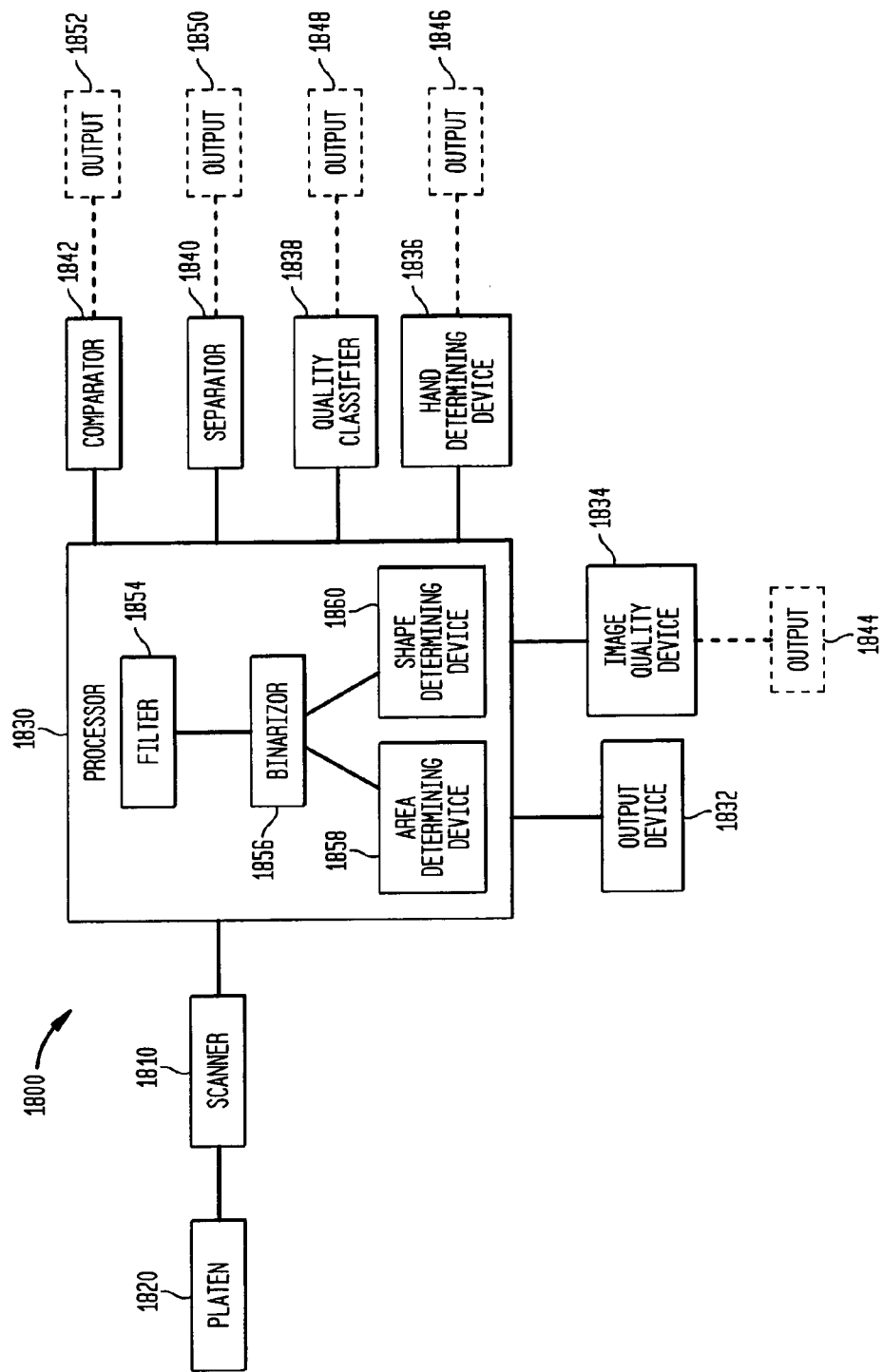
FIG. 18 shows a system that captures and processes biometric images according to embodiments of the present invention.

FIG. 18 shows a system 1800 that captures and processes biometric images according to embodiments of the present invention. System 1800 includes a scanner 1810 coupled between a platen 1820 and a processor 1830. Platen 1820 can be used to receive one or more fingers and/or one or more thumbs to be scanned by scanner 1810. Processor 1830 can be coupled to various devices, which can include: an output device 1832, an image quality device 1834, a hand determining device 1836, a quality classifier 1838, a separator 1840 that separates an overall four finger slap image into individual finger images, and a comparator 1842. Each of the devices 1834–1842 can be used to perform the corresponding functions described in process 600 as described above in FIGS. 6–8. Also, each of the devices 1834–1842 can have its own output or output device 1844–1852. Processor 1830 can include a filter 1854 and a binarizer 1856. A binarized signal from binarizer 1856 can be used by an area determining device 1858 and/or a shape determining device 1860. Again, each of the devices 1858–1860 can be used to perform the corresponding functions described in process 600 as described above in FIGS. 6–8.

CONCLUSION

Control functionality described above can be carried out in a ten print scanner, a computer coupled to the ten print scanner, or distributed between both the ten print scanner and the computer. Embodiments of the system have been described above with regard to a camera, including but not limited to a digital camera. This is not intended to limit the present invention because any type of sensor, detector, or camera can be used to capture a print image as is known in the art.

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for capturing and quality classifying fingerprint images, the method comprising:
   (a) scanning a plurality of fingers substantially simultaneously;
   (b) capturing data representing a combined image of a corresponding plurality of fingerprints;
   (c) using concentrations of black pixels arranged in oval-like shapes in the combined image to determine individual fingerprint areas and shapes;
   (d) separating the combined image into individual fingerprint images;
   (e) comparing each of the separated individual fingerprint images to a corresponding previously captured acceptable fingerprint image;
   (f) quality classifying the separated individual fingerprint images as being either acceptable, possibly acceptable, or unacceptable according to the comparing step (e);
   (g) indicating the quality classification of each of the individual fingerprint images based on the quality classifying step (f); and
   (h) determining whether the processed combined image is of a good quality.

2. The method of claim 1, further comprising:
   (d1) determining whether the combined image is a first image captured, wherein when the combined image is the first image captured, the method repeats steps (a)–(d) and the determining step (d1) before performing steps (e)–(g).

3. The method of claim 1, further comprising:
   determining whether the combined image is a first image captured, wherein when the combined image is not the first image captured, the method continues onto steps (e)–(g).

4. The method of claim 1, wherein step (c) comprises:
   (c1) filtering the combined image;
   (c2) binarizing the filtered combined image;
   (c3) detecting the individual fingerprint areas based on the concentrations of the black pixels in the binarized combined image;
   (c4) detecting the individual fingerprint shapes based on arrangements of the concentrated black pixels in oval-like shapes in the binarized combined image; and
   (c5) determining whether the individual fingerprint areas and shapes are acceptable.

5. The method of claim 4, wherein when the determining step (c5) determines whether each of the individual fingerprint areas and shapes are acceptable, then the method continues onto step (d).

6. The method of claim 4, wherein when the determining step (c5) determines each of the individual fingerprint areas and shapes are unacceptable, then the method returns to the scanning step (a).

7. The method of claim 1, wherein when the determining step (h) determines the combined image is of the good quality, the method further comprises:
   (i) determining whether the combined image is captured from a left or a right hand.

8. The method of claim 7, wherein the determining step (i) comprises:
   (i1) determining whether the combined image represents at least one finger that is positioned at a diagonal with respect to a section of a platen included in a scanner.

9. The method of claim 8, wherein when the determining step (i1) determines the finger is at a diagonal, the method further comprises:
   (i2a) determining whether the diagonal is at an angle greater than 90°.

10. The method of claim 9, wherein when the determining step (i2a) determines the diagonal is at an angle greater than 90°, an output indicates the combined image is from a right hand.

11. The method of claim 9, wherein when the determining step (i2a) determines the diagonal is at an angle less than 90°, an output indicates the combined image is from a left hand.

12. The method of claim 8, wherein when the determining step (i1) determines the finger is not at a diagonal, the method further comprises:

(i2b) determining whether a longest finger is on a right side of a finger guide coupled to the platen.

13. The method of claim 12, wherein when the determining step (i2b) determines the longest finger is on the right side of the finger guide, an output indicates the combined image is from a left hand.

14. The method of claim 12, wherein when the determining step (i2b) determines the longest finger is on a left side of the finger guide, an output indicates the combined image is from a right hand.

15. The method of claim 1, wherein when the determining step (h) determines the image is of a bad quality, the method further comprises determining whether a predetermined time period has expired.

16. The method of claim 15, wherein when the predetermined time period has expired, an output is generated indicating that a user can switch to a manual mode.

17. The method of claim 15, wherein when the predetermined time period is unexpired, the method returns to the scanning step (a).

18. The method of claim 4, wherein the determining step (c5) compares previous acceptable images to the binarized image to determine acceptability.

19. A method for capturing and processing a fingerprint image, the method comprising:
    (a) scanning one or more fingers;
    (b) capturing data representing a corresponding fingerprint image;
    (c) filtering the fingerprint image;
    (d) binarizing the filtered fingerprint image;
    (e) detecting a fingerprint area based on a concentration of black pixels in the binarized fingerprint image;
    (f) detecting a fingerprint shape based on an arrangement of the concentrated black pixels in an oval-like shape in the binarized fingerprint image; and
    (g) determining whether the detected fingerprint area and shape are of an acceptable quality.

20. The method of claim 19, wherein when the determining steps (e) and (f) detect a plurality of acceptable fingerprint areas and shapes in the binarized image, then the method further comprises: (h) separating the binarized image into individual fingerprint images.

21. The method of claim 19, wherein when the determining step (g) determines the fingerprint area and shape are unacceptable, then the method returns to step (a).

22. The method of claim 19, wherein the determining step (g) compares previous acceptable images to the binarized fingerprint image to determine acceptability.

23. A method of processing fingerprints, the method comprising:
    (a) scanning at least one finger placed on a platen of a scanner;
    (b) capturing data representing a corresponding fingerprint image; and
    (c) determining whether the fingerprint image includes data of an acceptable quality representative of at least one finger positioned at a diagonal relative to a section of the platen to thereby determine if the fingerprint image is from a left hand or a right hand based on detecting areas with concentrations of black pixels arranged in oval-like shapes in a binarized image.

24. The method of claim 23, wherein when the determining step (c) determines the finger is at a diagonal, the method further comprises:
    (c1) determining whether the diagonal is at an angle greater than 90°.

25. The method of claim 24, wherein when the determining step (c1) determines the diagonal is at an angle greater than 90°, an output indicates the fingerprint image is from a right hand.

26. The method of claim 24, wherein when the determining step (c1) determines the diagonal is at an angle less than 90°, an output indicates the fingerprint image is from a left hand.

27. The method of claim 23, wherein when the determining step (c) determines the image is not at a diagonal, the method further comprises:
    (c2) determining whether a longest finger is on a right side of a finger guide coupled to the platen.

28. The method of claim 27, wherein when the determining step (c2) determines the longest finger is on the right side of the finger guide, an output indicates the fingerprint image is from a left hand.

29. The method of claim 27, wherein when the determining step (c2) determines the longest finger is on a left side of the finger guide, an output indicates the fingerprint image is from a right hand.

30. A system for capturing and quality classifying fingerprint images, the system comprising:
    means for scanning a plurality of fingers substantially simultaneously;
    means for capturing data representing a combined image of a corresponding plurality of fingerprints;
    means for determining individual fingerprint areas and shapes based on concentrations of black pixels arranged in oval-like shapes in the combined image;
    means for separating the combined image into individual fingerprint images;
    means for comparing each of the separated individual fingerprint images to a corresponding previously obtained acceptable fingerprint image;
    means for quality classifying the separated individual fingerprint images as being either acceptable, possibly acceptable, or unacceptable according to the comparison;
    means for indicating a quality classification of each of the individual fingerprint images based on the means for quality classifying; and
    means for determining whether the processed combined image is of a good quality.

31. The system of claim 30, further comprising:
    means for determining how many of the combined images have been captured.

32. The system of claim 30, wherein the means for determining individual fingerprint areas and shapes comprises:
    means for filtering the combined image of the plurality of fingerprints;
    means for binarizing the filtered combined image;
    means for detecting a fingerprint area based on the concentrations of black pixels in the binarized image;
    means for detecting a fingerprint shape based on arrangements of the concentrated black pixels in oval-like shapes in the binarized image; and
    means for determining whether the individual fingerprint areas and shapes are acceptable.

33. The system of claim 30, further comprising:
    means for determining whether the combined image is captured from a left or a right hand.

34. The system of claim 33, wherein the means for determining left or right hand comprises means for determining whether the combined image includes an image representative of at least one finger positioned at a diagonal relative to a section of a platen included in a scanner.

35. The system of claim 33, wherein the means for determining left or right hand comprises means for determining whether a longest finger is on a right side or a left side of a finger guide coupled to the platen.

36. A system for capturing and processing data representative of a fingerprint image, the system comprising:
   means for scanning one or more fingers;
   means for capturing the data representing the fingerprint image;
   means for filtering the fingerprint image;
   means for binarizing the filtered fingerprint image;
   means for detecting a fingerprint area based on a concentration of black pixels in the binarized fingerprint image;
   means for detecting a fingerprint shape based on an arrangement of concentrated black pixels in oval-like shape in the binarized fingerprint image; and
   means for determining whether the detected fingerprint area and shape are of acceptable quality.

37. The system of claim 36, further comprising means for separating the binarized fingerprint image into individual fingerprint images, if a plurality of acceptable fingerprint areas and shapes are detected.

38. A system for processing fingerprints, the system comprising:
   means for scanning at least one finger placed on a platen;
   means for generating data representative of a fingerprint image associated with the at least one finger; and
   means for determining whether the at least one finger is from a left or a right hand, based on concentrations and arrangements of black pixels in a binarized fingerprint image.

39. The system of claim 38, wherein the means for determining comprises means for determining whether a longest finger is on a right side or a left side of a finger guide coupled to the platen.

40. The system of claim 38, wherein the means for determining comprises means for determining whether the captured fingerprint image includes an image representative of at least one finger positioned at a diagonal relative to a section of the platen.

41. A system, comprising:
   a platen that receives a plurality of fingers or thumbs;
   a scanner that substantially simultaneously scans the plurality of fingers or thumbs on the platen;
   an image capturer that captures data representing a corresponding combined fingerprint image of the plurality of fingers or thumbs;
   a processor that processes the combined fingerprint image;
   a separator that separates the processed combined fingerprint image into individual fingerprint images;
   a comparator that compares the captured fingerprint image to a previously obtained acceptable fingerprint image;
   a classifier that classifies each of the separated individual fingerprint images as being either acceptable, possibly acceptable, or unacceptable according to results of the comparison;
   an output device that indicates a classification of each of the individual fingerprint images based on the classifier; and
   an image quality determining device that determines whether the captured combined fingerprint image is of a good quality.

42. The system of claim 41, wherein the processor comprises:
   a filter that filters the combined fingerprint image; and
   a binarizor that binarizes the filtered combined fingerprint image.

43. The system of claim 42, wherein the processor further comprises:
   an area determining device that determines an area of each of the individual fingerprint image based on a concentration of black pixels in the binarized combined image.

44. The system of claim 42, wherein the processor further comprises:
   a shape determining device that determines a shape of each of the individual fingerprint images based on an arrangement of concentrated black pixels in oval-like shape in the binarized combined image.

45. The system of claim 41, further comprising a hand determination device that determines which hand(s) the plurality of fingers or thumbs belongs to.

* * * * *

UNITED STATES PATENT AND TRADEMARK OFFICE
CERTIFICATE OF CORRECTION

PATENT NO.       : 7,203,344 B2
APPLICATION NO.  : 10/345420
DATED            : April 10, 2007
INVENTOR(S)      : George W. McClurg It is certified that error appears in the above-identified patent and that said Letters Patent is hereby corrected as shown below:

Page 3 of Title Page, Item [56], FOREIGN PATENT DOCUMENTS section, please replace "JP  0 623 890 A2 11/1994" with --EP  0 623 890 A2 11/1994--.

Signed and Sealed this

Twelfth Day of June, 2007

JON W. DUDAS
*Director of the United States Patent and Trademark Office*